United States Patent [19]

Woods et al.

[11] 4,084,232
[45] Apr. 11, 1978

[54] POWER CONFIDENCE SYSTEM

[75] Inventors: John M. Woods, Glendale; Bruce C. Keene, Phoenix, both of Ariz.

[73] Assignee: Honeywell Information Systems Inc., Waltham, Mass.

[21] Appl. No.: 771,606

[22] Filed: Feb. 24, 1977

[51] Int. Cl.² ............... G06F 11/06; G08B 29/00; G05B 13/02; H02H 7/00
[52] U.S. Cl. ........................... 364/200; 307/38; 307/82
[58] Field of Search ............... 364/200, 900; 235/61.1; 363/97, 124; 307/38, 39, 40, 41, 82, 125, 149

[56] References Cited
U.S. PATENT DOCUMENTS

| | | | |
|---|---|---|---|
| 3,566,359 | 2/1971 | Connelly | 364/900 |
| 3,588,518 | 6/1971 | Wavre | 307/38 |
| 3,697,767 | 10/1972 | Fioravanti | 307/38 X |
| 3,704,451 | 11/1972 | Pearson | 364/900 |
| 3,736,491 | 5/1973 | Kuster | 363/97 X |
| 3,742,463 | 6/1973 | Haselwood et al. | 364/900 |
| 3,790,809 | 2/1974 | Kuster | 307/41 |
| 3,792,285 | 2/1974 | Procter et al. | 307/38 |
| 3,816,809 | 6/1974 | Kuster | 363/97 X |
| 3,818,307 | 6/1974 | Hamilton et al. | 307/82 |
| 3,860,914 | 1/1975 | Zitelli et al. | 364/900 |
| 3,890,559 | 6/1975 | Kuster | 307/82 |
| 3,903,430 | 9/1975 | Arns | 307/125 |
| 3,905,025 | 9/1975 | Davis et al. | 364/900 |
| 3,913,001 | 10/1975 | Kayama | 363/124 X |
| 3,937,978 | 2/1976 | Owenby | 307/41 |
| 3,959,778 | 5/1976 | Brette | 364/200 |
| 3,961,200 | 6/1976 | Dute | 364/900 |
| 3,969,703 | 7/1976 | Kwiatkowski et al. | 364/900 |
| 3,970,992 | 7/1976 | Boothroyd et al. | 364/900 |
| 3,984,813 | 10/1976 | Chung | 364/200 |
| 3,997,879 | 12/1976 | Markley et al. | 364/900 |
| 4,003,030 | 1/1977 | Takagi et al. | 364/900 |
| 4,006,456 | 2/1977 | Wilk | 364/200 |
| 4,013,936 | 3/1977 | Hesler et al. | 307/82 X |
| 4,016,540 | 4/1977 | Hyatt | 364/200 |
| 4,020,472 | 4/1977 | Bennett et al. | 364/200 |
| 4,028,620 | 6/1977 | Kitagawa et al. | 307/38 X |
| 4,031,406 | 6/1977 | Leyde et al. | 307/41 |
| 4,042,832 | 8/1977 | Cassarino et al. | 307/149 |

*Primary Examiner*—Gareth D. Shaw
*Assistant Examiner*—Jan E. Rhoads
*Attorney, Agent, or Firm*—Faith F. Driscoll; Nicholas Prasinos; Ronald T. Reiling

[57] ABSTRACT

A data processing system includes as part of its power circuits, a number of converter circuits, each coupled to a different one of the power supply units which are to provide different voltages for distribution and use throughout the system. Each of the power supply circuits furnish a 24 volt dc power confidence signal to a central ac power input entry panel which applies the power confidence signals to the converter circuits. Each converter circuit includes an optically coupled isolator circuit which converts the 24 volt dc signal to a noise free low voltage logic level suitable for utilization by the low level high speed logic circuits included within the system. The output noise free low voltages provided by the converter circuits are in turn applied to a corresponding number of confidence input lines of a system interface unit which includes a plurality of ports, each port connected to a different module within the data processing system. The states of the low voltage logical level signals are stored in a status register. When the operating system determines that a unit is inoperative due to a power supply unit failure, it can logically disconnect the port having a module having the failure. Additionally, one of the converter circuits provides a second output signal which is used to enable the clock circuits during system power up only after the system has been placed in a known state.

36 Claims, 21 Drawing Figures

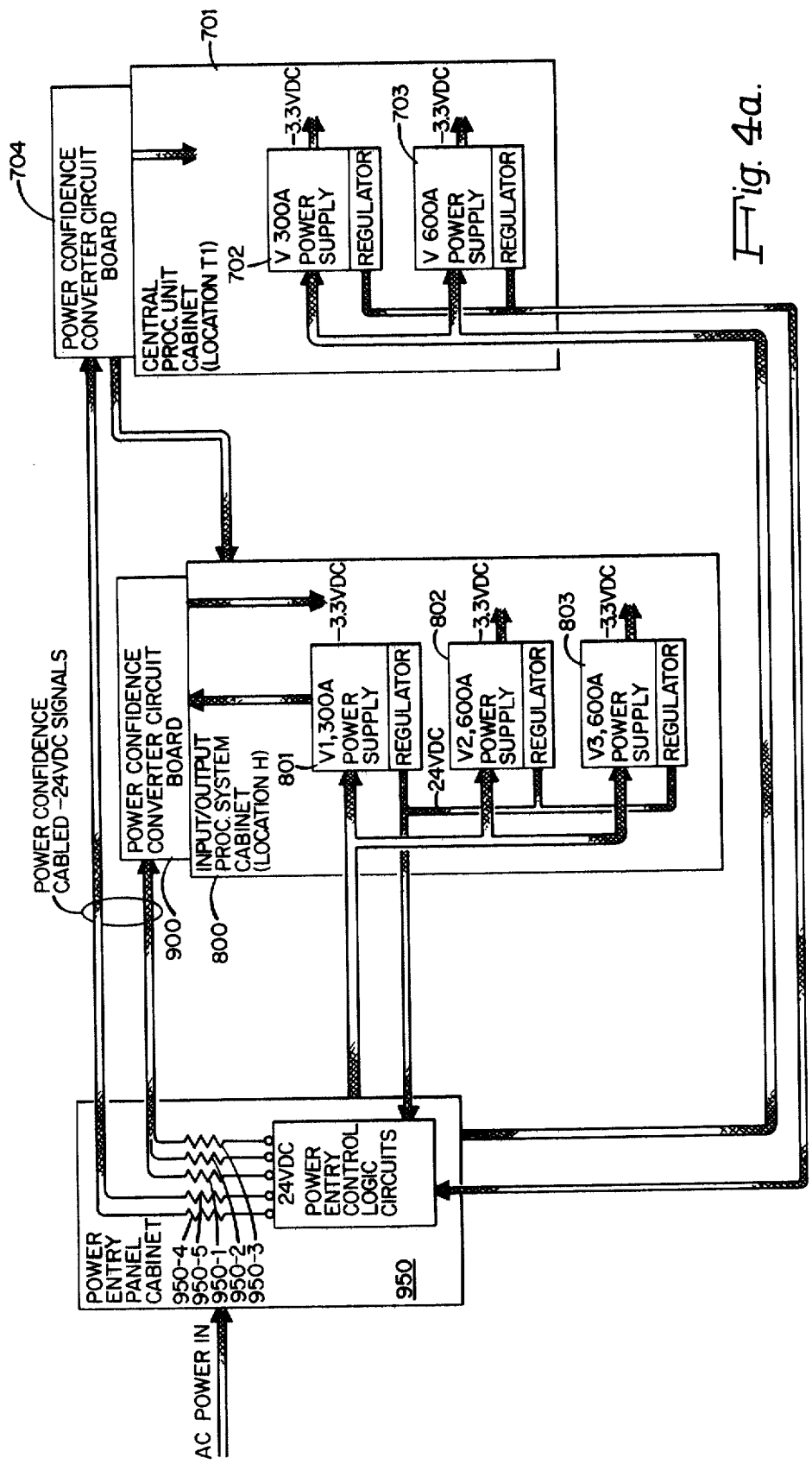

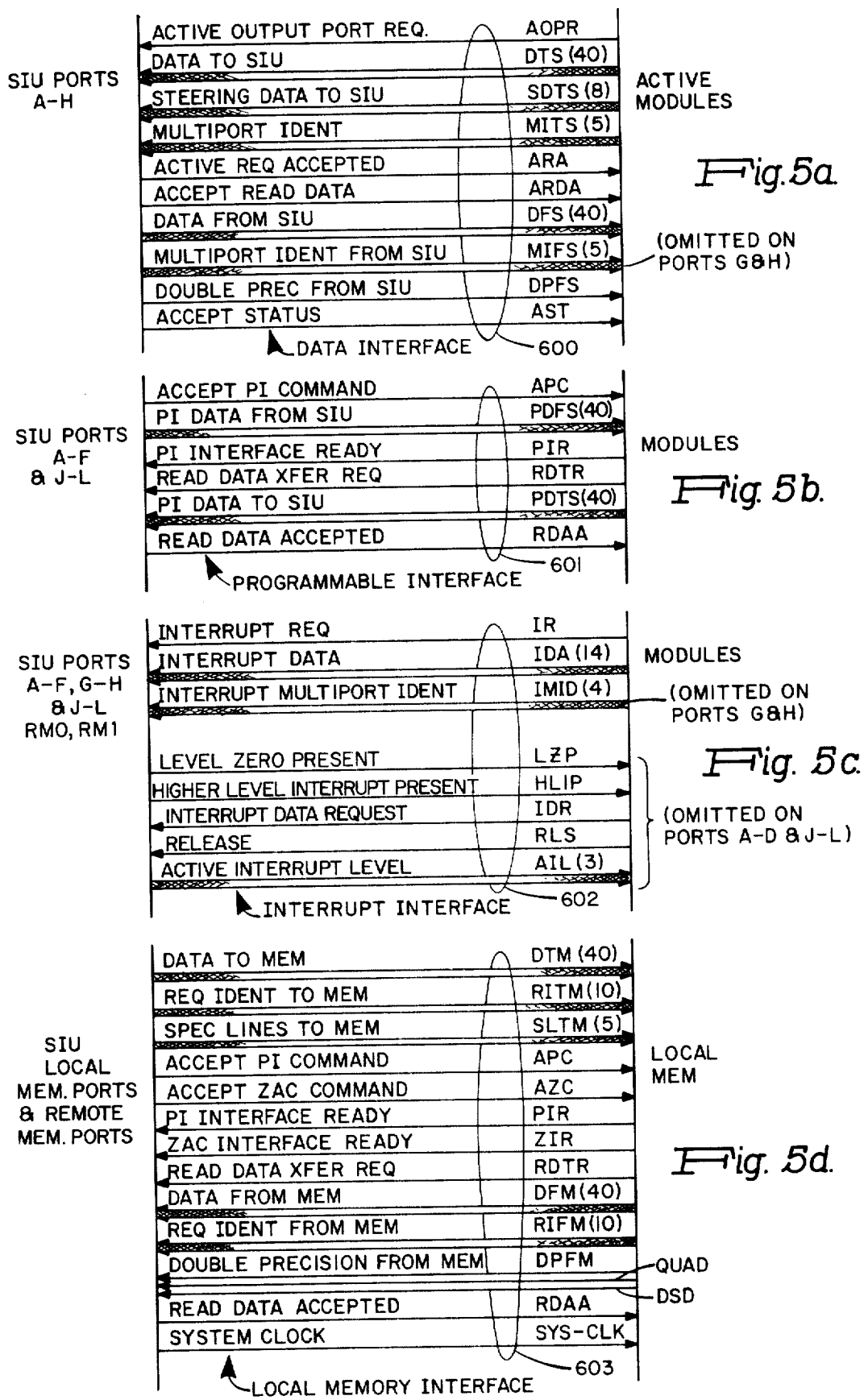

CONFIGURATION REGISTER 00₈

```
0           89                   2324  2728 293031   3435
┌───────────┬──────────────────┬─────┬─┬───┬────┬──┐
│ SIU I.D.  │      OPI'S       │ PID │E│RFU│ PC │L │
│           │                  │     │A│   │    │M │
│           │                  │     │I│   │    │  │
│           │                  │     │P│   │    │  │
└───────────┴──────────────────┴─────┴─┴───┴────┴──┘
```

BIT 28 = EAIP = ENABLE ALTERNATE INTERRUPT PATH
  RFU = RESERVED FOR FUTURE USE
* PC = PROCESSOR CONFIGURATIONS
BITS 31,32 = MODULE NO. 1 CONFIGURATION
   X  X—MODULE F ENABLED (1=ENABLED)
   L———MODULE E ENABLED (1=ENABLED)
BITS 33,34 = MODULE NO. 0 CONFIGURATION
   X  X—MODULE H ENABLED (1=ENABLED)
   L———MODULE G ENABLED (1=ENABLED)
  LM = LOCAL MEMORY ASSIGNMENT
       1=LOCAL MEMORY PORT 1 TO BE ACCESSED FOR BOOTLOAD
       0=LOCAL MEMORY PORT 0 TO BE ACCESSED FOR BOOTLOAD
* BITS 31-32 OR
   33-34 = 11 MEANS THAT THE PROCESSORS ARE BOTH ENABLED, LOCKED AND RUNNING
           IN THE COMPARE MODE

SIU I.D. = SIU = 200₈ (010000000)
OPI'S=BIT 9 = OPI PRESENT ON PORT A
       10 = OPI PRESENT ON PORT B
       •                •
       •                •
       18 = OPI PRESENT ON PORT K
       19 = OPI PRESENT ON LM 0
       20 = OPI PRESENT ON LM 1
       21 = OPI PRESENT ON RM 0
       22 = OPI PRESENT ON RM 1
       23 = RFU
  PID = PROCESSOR IDENTIFIERS
  BIT 24 = 1=MODULE PRESENT ON PORT E IS A PROC.
      25 = 1=MODULE PRESENT ON PORT E HAS A P I INTERFACE
      26 = 1=MODULE PRESENT ON PORT F IS A PROC.
      27 = 1=MODULE PRESENT ON PORT F HAS A PI INTERFACE

*Fig. 8a.*

INITIALIZE REGISTER (4)₈

```
0              1314              2728    35
┌──────────────┬─────────────────┬────────┐
│ PORT MASK    │ PORT INITIALIZE │   NA   │
│ CONTROL REG. │ CONTROL REG.    │        │
└──────────────┴─────────────────┴────────┘
```

BIT 0 = PORT A  1=SET MASK  0=RESET MASK
    •       •
    •       •
    9 = PORT K  1=SET MASK  0=RESET MASK
BIT 14 = PORT A  1=SENT INITIALIZE TO PORT
    •       •
    •       •
    23 = PORT K  1=SENT INITIALIZE TO PORT
NA = NOT AVAILABLE

*Fig. 8b.*

FORMAT AT SIU STATUS REG. #2 (10)₈

```
0         89  1213 14           26 27      35
┌──────────┬────┬─┬──────────────┬──────────┐
│ PROC.    │    │R│   POWER      │          │
│ MISCOMPARE│DPCR│F│ CONFIDENCE  │    NA    │
│ ERROR    │    │U│              │          │
└──────────┴────┴─┴──────────────┴──────────┘
```

BITS 14-26 POWER CONFIDENCE (1=CONFIDENCE)
  BIT 14 = (H) REG. POWER SUPPLY, V1, CONFIDENCE.
      15 = (H) POWER SUPPLY UNIT, V2, CONFIDENCE.
      16 = (H) REG. POWER SUPPLY, V3, CONFIDENCE.
      17 = (T1) THE 600 AMP REG. POWER SUPPLY UNIT CONFIDENCE.
      18 = (T1) THE 300 AMP REG. POWER SUPPLY UNIT CONFIDENCE.
      19-24 = RESERVED FOR EXPANSION.

*Fig. 8d.*

FAULT STATUS REGISTER #1(7)₈

| 0 | 11 12 | 15 16 | | 21 22 23 24 25 26 27 28 | 31 32 | 35 0 | 15 |
|---|---|---|---|---|---|---|---|
| SID ERRORS | PORT POINTER | SIE | P R P F | P P F | L M 0 | L M 1 | L M 2 | L M 3 | PEL | PTL | PORT DESIGNATIONS |

SID ERROR = STEERING, INTERRUPT & DATA ERRORS IN THE SIU INTERRUPT & MULTIPLEXING LOGIC CIRCUITS
  BIT 0 = PARITY ERROR ON "TO" STEERING
      1 = PARITY ERROR ON "RETURN" STEERING
      2 = PARITY ERROR ON INTERRUPT LEVEL
      3 = PARITY ERROR ON INTERRUPT ICBD
      4 = PARITY ERROR ON PI DATA FROM LOGIC MODULE
      5 = PARITY ERROR ON DATA FROM ACTIVE PORT
      6 = PARITY ERROR ON DATA FROM MEMORY
      7 = PARITY ERROR ON BITS 4, 5 & 6 IS ON BYTE 0
      8 = PARITY ERROR ON BITS 4, 5 & 6 IS ON BYTE 1
      9 = PARITY ERROR ON BITS 4, 5 & 6 IS ON BYTE 2
     10 = PARITY ERROR ON BITS 4, 5 & 6 IS ON BYTE 3
     11 = RFU
PORT POINTER = THE SIU PORT NUMBER FROM WHICH THE ERROR IN BITS 0-11 EMANATED.

| PORT NO. | PORT DESIGNATED |
|---|---|
| 1101 | A |
| 1001 | B |
| 1010 | C |
| ⋮ | G |
| ⋮ | H |
| ⋮ | ⋮ |
| 0010 | L |
| 0000 | LM0 |
| 0100 | LM1 |
| 1000 | REMA0 |
| 1100 | REMA1 |

SIE = SIU INTERNAL ERRORS (SIU = PORT L)
  BIT 16 = COMMAND PARITY ERROR ON PI TO SIU PORT L
      17 = PARITY ERROR ON WRITE PI DATA TO SIU PORT L
      18 = ERROR IN BITS 16 & 17 IS ON BYTE 0
      19 = ERROR IN BITS 16 & 17 IS ON BYTE 1
      20 = ERROR IN BITS 16 & 17 IS ON BYTE 2
      21 = ERROR IN BITS 16 & 17 IS ON BYTE 3
      23 = PRIMARY POWER FAILURE
LM0-LM3 = ERROR INDICATED FROM LOCAL MEMORY
PEL = PARITY ERROR LINES FROM PROCESSORS
  BIT 28 = PARITY ERROR INDICATED FROM PROCESSOR ON PORT E
      29 = PARITY ERROR INDICATED FROM PROCESSOR ON PORT F
      30 = PARITY ERROR INDICATED FROM PROCESSOR ON PORT G
      31 = PARITY ERROR INDICATED FROM PROCESSOR ON PORT H
PTL = TROUBLE LINES FROM PROCESSORS
      32 = TROUBLE LINE FROM PROCESSOR ON PORT E
      33 = TROUBLE LINE FROM PROCESSOR ON PORT F
      34 = TROUBLE LINE FROM PROCESSOR ON PORT G
      35 = TROUBLE LINE FROM PROCESSOR ON PORT H
BITS 0-15 = PORT DESIGNATIONS
    THE ENCODED INFORMATION CONTAINED IN BITS 12-15 IS STORED IN BITS 0-15 OF ANOTHER REGISTER PRIOR TO ENCODING.
  BIT 0 = PORT A
      1 = PORT B
      ⋮   ⋮
      9   PORT K
  BIT 15 = REMA1

POWER CONFIDENCE SYSTEM

RELATED APPLICATIONS

1. "Maintenance Apparatus" invented by John M. Woods, et al. bearing Ser. No. 752,345, filed on Dec. 20, 1976 and assigned to the same assignee as named herein.

2. "Automatic Reconfiguration Apparatus for Input-/Output Processor" invented by Jaime Calle, et al. bearing Ser. No. 686,975, filed on May 15, 1976 and assigned to the same assignee as named herein.

3. "Input/Output Processing System Utilizing Locked Processors" invented by John M. Woods, et al. bearing Ser. No. 741,632, filed on Nov. 15, 1976 and assigned to the same assignee as named herein.

BACKGROUND OF THE INVENTION

1. Field of Use

The present invention relates to data processing systems and in particular, power systems which provide voltages required for operating such data processing systems.

2. Prior Art

In some systems, the various power supply units of the different units of a data processing system include logic circuits for converting regulated voltage power supply signals to voltage levels for signalling the power confidence of such units to the systems. In such systems, it was necessary to connect the power unit circuits and logic circuits to different ground reference voltages. This in turn introduced noise into the logic circuits. Since such systems were implemented with transistor logic circuits which operated with high voltage thresholds, such noise did not affect system operation.

However, it has become advantageous to consolidate the power control of data processing systems within a central panel thereby increasing the noise levels in which system circuits must operate. Additionally, for reasons of increased system performance, such systems employ high speed low level logic circuits.

Hence, it has been found that operating such logic circuits in such arrangements could give rise to unreliable signalling as to the power confidence or integrity of systems units.

Another disadvantage of the above arrangements is that because the logic circuits were included within the power circuits of each unit, it was difficult to determine whether a voltage failure is the cause of a particular unit not operating properly.

Accordingly, it is a primary object of the present invention to provide an improved power confidence system suitable for use with high speed low level logic circuits.

It is another object of the present invention to provide a power system which facilitates the diagnosis of power supply voltage failures within a data processing system.

SUMMARY OF THE INVENTION

The above objects are achieved in a preferred embodiment of the present invention which includes the system comprising of a plurality of modules including at least one processing unit and a system interface unit having a plurality of ports. The modules are implemented with high speed logic circuits which are required to operate with very low voltage levels. In the preferred embodiment, the high speed logic circuits employed are current mode or ECL logic circuits. Each of the ports connect to the interfaces of a different one of the plurality of modules for communication of information between modules.

The different power supply units apply dc voltage level signals to the circuits of a central ac power input unit for distribution to other portions of the system. According to the teachings of the present invention, the system includes converter circuits for transforming the dc voltage levels to noise free low voltage levels utilized directly by the systems current mode logic circuits. Each of the low voltage signals are applied via a corresponding number of power confidence lines as inputs to the system interface unit whereafter they are staticized and distributed to the modules via the ports to which each connect.

In greater detail, a predetermined status register is included within the system interface unit for storage and display of the received power confidence signals pertaining to all of the voltages utilized by the low level high speed logic circuits in the system. In accordance with the present invention, a different bit position of the status register is used to indicate the status of each of the different power supply units utilized within the system. The bit position associated with each power supply unit is set to a first predetermined state for indicating a power confident condition (i.e., operating within established limits). The bit position is set to a second predetermined state complementary to the first when the power supply unit is not power confident.

By displaying the power confidence signal indications in the system interface unit register, the operating system can determine when certain processing modules or other modules are inoperative due to a power supply failure. More importantly, the system is able to disconnect logically any port that falls out of confidence before the module connected thereto can destroy valuable data being processed by the system. For example, the arrangement protects or prevents a disk device from having bad data written thereon as a consequence of a power failure.

In accordance with the present invention, the one of the converter circuits which generates the power confidence signal for the power supply unit used to operate the system interface unit, includes means for generating a second output. This output serves as an enable signal for the system clocking circuits. Since the enable signal is derived from the same source as the voltage used to operate the system interface unit whose proper functioning is essential to system operation, the clocking circuits are only enabled when those power supply unit circuits are deemed "power confident". That is, the system is not operative to generate an initialize signal until the particular bit position of the status register is set to the first predetermined state.

In accordance with the present invention, each converter circuit includes an optically coupled isolator sensing circuit connected to receive the dc output voltage from the particular power supply unit circuits associated therewith. The optically coupled input isolation circuit is operative to provide a noise free output signal which is applied as one input to a level detector circuit. The detector circuit generates a predetermined output signal when the input signal is sufficient in magnitude to be deemed "confident". The output signal from the detector circuit is in turn applied to an output driver circuit which generates a low voltage level which is utilized directly by the system high speed low level logic circuits to provide the required power confidence indications. By having each converter circuit provide the required low voltage level, which is noise free, the complexity and number of circuits is minimized.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 4a illustrates diagrammatically the units which comprise the power system of FIG. 1 in accordance with the present invention.

FIG. 4b illustrates schematically the power system of FIG. 4a.

FIG. 5a shows the lines which comprise a data interface in FIG. 1.

FIG. 5b shows the lines which comprise a programmable interface in FIG. 1.

FIG. 5c discloses lines which comprise an interrupt interface in FIG. 1.

FIG. 5d shows the lines which comprise a local memory interface in FIG. 1.

FIGS. 8a through 8d illustrate the formats of the contents of the different registers included in the system interface unit 100 of FIG. 1 in accordance with the present invention.

DESCRIPTION OF THE PREFERRED EMBODIMENT

General Description

Figure 1:
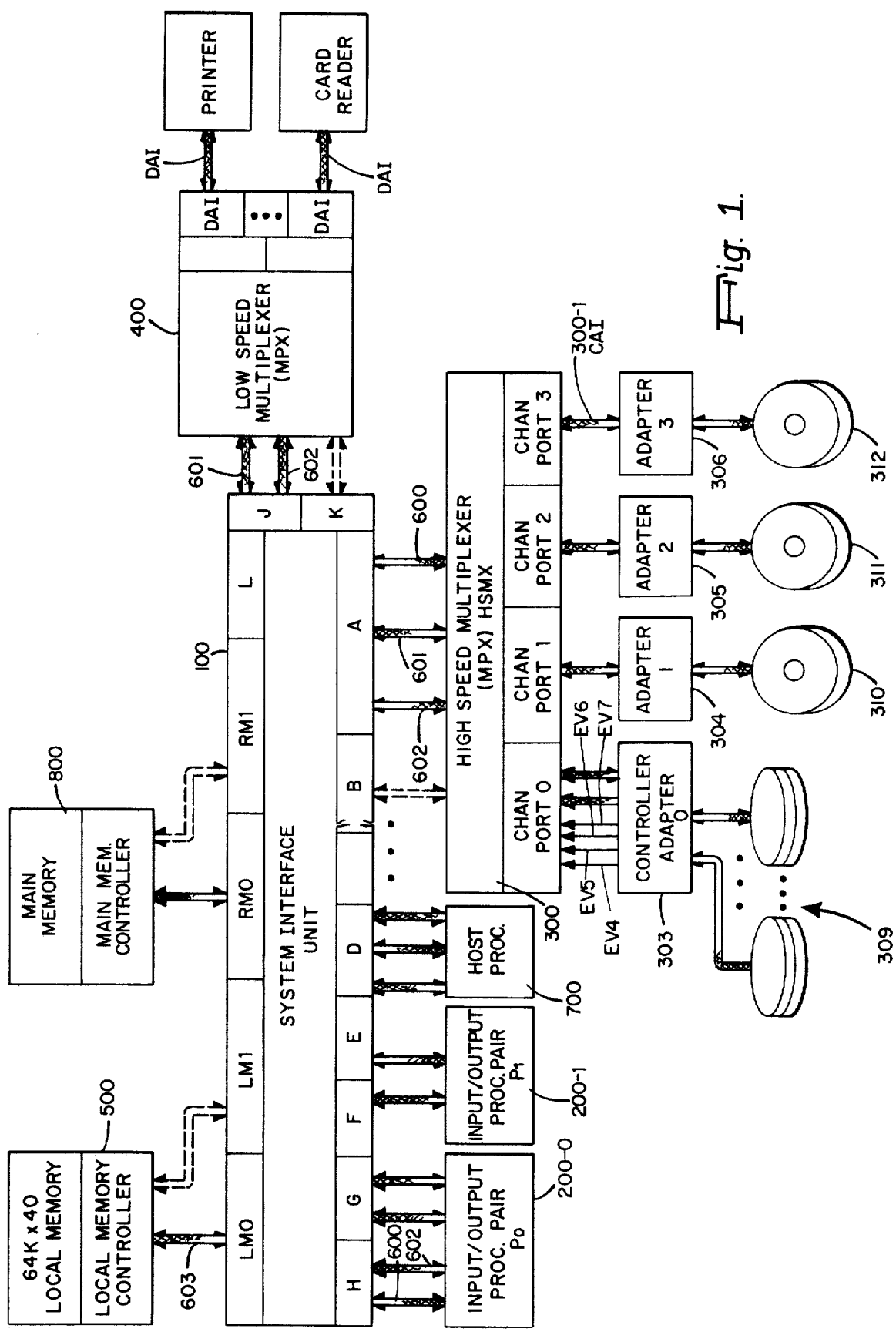
FIG. 1 illustrates in block diagram form a data processing system employing the principles of the present invention.

As seen from FIG. 1, the system which incorporates the principles of the present invention includes two input/output processor (IOPP) pairs 200-0 and 200-1, a system interface unit (SIU) 100, a high speed multiplexer (HSMX) 300, a low speed multiplexer (LSMX) 400, a host processor 700, a local memory module 500, and a main memory module 800. Different ones of these modules connect to one of a number of ports of the system interface unit 100 through a plurality of lines of different ones of different types of interfaces 600 through 603. More specifically, the two input/output processors of logical pair 200-0 and 200-1, the host processor 700, and high speed multiplexer 300 connect to ports G, H, E, F, D, and A, respectively, while the low speed multiplexer 400, memory modules 500 and 800 connect to ports J, LMO, and RMO, respectively.

The input/output system of FIG. 1 can be viewed as including a number of "active modules", "passive modules", and "memory modules". The IOP processor 200, host processor 700, and high speed multiplexer 300 serve as active modules in that each has the ability to issue memory commands. The active modules normally connect to ports A through H. A plurality of passive modules are connected to three ports J, K, and L. These modules correspond to the low speed multiplexer 400 and the system interface unit 100 and are units capable of interpreting and executing commands applied to the lines of interface 601 as described herein. The last group of modules constitutes local memory modules and remote memory modules (not shown) such as those of the main system (not shown) which are capable of executing two different types of commands applied to the lines of interface 603.

The input/output system of FIG. 1 normally functions as an input/output subsystem responsive to input/output instructions issued by host processor 700 which normally connects to port D via the interface 600, 601, and 602 which correspond to a data interface, a programmable interface, and an interrupt interface, respectively, described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiatess and terminates channel programs required for the execution of input/output instructions, processes interrupt requests received from the system interface unit 100 and directly controls unit record peripheral devices coupled to low speed multiplexer 400. The processor pair 200-0 connects to ports G and H via the data interface 600 and interrupt interface 602.

The low speed multiplexer 400 which for the purposes of the present invention can be considered conventional in design, provides for attachment of low speed peripheral devices via peripheral adapters, each of which couples to the lines of a device adapter interface (DAI). The interface and adapter may take the form of those units described in U.S. Pat. No. 3,742,457, which is assigned to the assignee of the present invention. The low speed devices include card readers, card punches, printers, and consoles. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which connects to a maximum of 16 devices, in turn, connects to a different one of the ports or channels 0 through 3 via the interface lines of a channel adapter interface (CAI) 301-1. The high speed multiplexer 300 connects to port A corresponding to a data interface 600, a programmable interface 601, and an interrupt interface 602.

For the purposes of the present invention, each of the channel controller adapters 302 through 305 may be considered conventional in design and take the form of controller adapters described in the aforementioned U.S. Pat. No. 3,742,457.

As mentioned previously, each of the modules connects to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

The Port Interfaces

Before describing in greater detail different ones of the modules of FIG. 1, each of the interfaces 600 through 603 referred to previously will now be described with reference to FIGS. 5a through 5d.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed "a dialog".

As seen from FIG. 5a, the interface includes an active output port request line (AOPR), a plurality of data to SIU lines (DTS O0-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST). The description of the interface lines is given in greater detail in the section to follow.

| DATA INTERFACE LINES | |
|---|---|
| Designation | description |
| AOPR | The active output port request line is a unidirectional line which extends from each of the active modules to the SIU 100. When set, this line signals the SIU that the module requests a transfer path over which a command or a command and data is to be transferred. |
| DTS 00-35, P0-p3 | The data to SIU lines are a four byte wide unidirectional path (four 10 bit bytes) that extend between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows:<br>a) The state of bit 0 – The type of command applied to the DTS lines (whether the command is a programmable interface command or a memory command).<br>b) Bits 1–4 are coded to indicate which one of the modules is to receive and interpret the command (memory or ZAC commands |

| DATA INTERFACE LINES | |
|---|---|
| Designation | description |
| | are interpreted only by memory modules and programmable interface commands shall be interpreted by all modules except input/output processors 200–0).<br>c) The state of bit 5 indicates whether one or two words of the command information is to be transferred between the requesting active module and the designated receiving module (one word specifies a single precision transfer and two words specifies a double precision transfer).<br>d) The state of bit 6 indicates the direction of transfer between the requesting module and the designated receiver module.<br>e) Bit P is a parity bit generated by the requesting active module which is checked by apparatus included within the SIU 100. |
| MITS 0-3, P | The four multiport identifier to SIU lines extend from the active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-p3 | The data from SIU lines are another set of data path lines which are a four byte wide unidirectional path (four 10 bit bytes) which extends from the SIU to each active module. This set of lines is used by the SIU 100 to convey read type data to a designated one of the active modules. |
| MIFS 0-3, P | The four multiport identifier from SIU lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that is should accept status information applied to the DFS lines. |

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog". The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extends from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extend from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines |

A further interface is the interrupt interface 602 of FIG. 5c which provides for interrupt processing by the input/output processor pairs 200-0 and 200-1. That is, the interface enables the transfer of interrupt information by a module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1), and a plurality of interrupt multiport identifier lines (IMID 00-03) for modules connected to ports A through L. For modules connected to ports G and H, the interrupt interface further includes a level zero present line (LZP), a higher level interrupt present line (HLIP), an interrupt data request line (IDR), a release line (RLS), and a plurality of active interrupt level lines (AIL0-2). As seen from FIG. 5c, the interrupt interface ports G and H do not include an interrupt multiport identifier line. The description of the interrupt lines is given in greater detail herein.

| INTERRUPT INTERFACE LINES | |
|---|---|
| Designation | Description |
| IR | The interrupt request line extends from each module to the SIU 100. When set, this line indicates to the SIU that it requires service. |
| IDA 0-3, P0<br>IDA 4-11, P1 | The interrupt data lines extend from a module to the SIU 100. These lines are coded to contain control information required to be transferred to the input/output processor. These bits are coded as follows:<br>a) The state of bit 0 specifies to the SIU 100 which of the two processors (i.e., |

-continued

| INTERRUPT INTERFACE LINES | |
|---|---|
| Designation | Description |
| | processor number) is to process the interrupt request.<br>b) Bits 1-3 are coded to indicate the priority or level number of the interrupt request to the SIU 100.<br>c) Bit P0 is a parity bit for bits 0-3.<br>d) Bits 4-8 are coded to provide a portion of an address required to be generated by an input/output processor for referencing the correct procedure for processing the interrupt (i.e., an interrupt control block number ICBN).<br>e) Bit P1 is a parity bit for bits 4-11. |
| IMID00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor. When set, this line indicates that there is a highest priority (level 0 interrupt) request being directed to a processor by the SIU 100. |
| HLIP | The higher level interrupt present line extends from the SIU to each input/output processor. When set, this line indicates that there is an interrupt request having a higher level of priority than the procedure or process being executed by the processor. |
| IDR | The interrupt data request line extends from the input/output processor to the SIU 100. When set, this line indicates that interrupt data is to be sent to the processor on lines DFS by the SIU 100. |
| RLS | The release line extends from each input/output processor to the SIU 100. This line, when set, indicates that the processor has completed execution of the current procedure. |
| AIL 0-2 | The active interrupt level lines extend from the SIU to the input/output processor. These lines are coded to designate the interrupt level number of the procedure being executed by the processor. |

A further set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed "a dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3), a plurality of request identifier from memory lines (RIFM 0-7, P0-P1), a double precision from memory line (DPFM, a QUAD line, a read data accepted line (RDAA) and a system clock line (SYSCLK). A similar interface is used for connecting the main memory module 800 to the SIU 100.

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines is given in greater detail herein.

| LOCAL MEMORY INTERFACE LINES | |
|---|---|
| Designation | Description |
| DTM 00-35, P0-3 | The data path lines constitute a four byte wide unidirectional path (36 information lines and four odd parity lines) that extends from the SIU 100 to the local memory 500. These lines are used to transfer memory or programmable interface commands and data to the local memory 500. |
| RITM 0-3, P0 RITM4-7, P1 | The requestor identifier to memory lines constitutes two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to and a parity line. The information signals applied to these lines are coded as follows. <br> a) Bits 0-1 are poert number selection bits coded to specify which port or subchannel within the attached module is to receive or interpret the memory command sent to the module. <br> b) Bit 2 is a read/write to memory bit which is included in the steering control information received from the active module which is forwarded by the SIU to the local memory 500 when a new command is sent to the memory by the SIU 100. The state of this bit indicates the direction of data transfer. <br> c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR ZIR | The programmable interface ready line and ZAC interface ready line extends from the local memory module 500 to the SIU100. When set, these lines signal the SIU 100 that the local memory module 500 is capable of accepting a programmable interface (PI) or memory (ZAC) command. |
| RDTR | The read data transfer request line extends from the local memory module 500 to the SIU 100. This line, when set, indicates that the read type data previously requested by a ZAC or PI command is available along with the necessary control information to be sent to the module requesting the data. |
| DFM 00-35, P0-P3 | The data from memory lines are a four byte wide unidirectional bus which extends from the local memory module 500 to the SIU 100. These lines are used to return read requested type data to an active module via the SIU 100. |
| RIFM 0-3, P0, rifm 4-7, P1 | The two groups of requestor identifier from memory lines extend from the local memory module 500 to the SIU 100. These lines are coded for directing the read data back from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during |

| LOCAL MEMORY INTERFACE LINES | |
|---|---|
| Designation | Description |
| | read data transfer request time interval. These lines are coded as follows <br> QUAD, DPFM <br> 0    0    one word single precision <br> 0    1    two words, double precision <br> 1    X    (don't care) four words |
| DSD | The read data/status identifier line extends from the local memory module 500 to the SIU. The state of this line signals the SIU 100 whether the information applied to the lines DFM is read data or status information when line RDTR is set. When set, the line indicates status information of one or two words (QUAD=0) is being transferred. When set to a binary ZERO, the line signals that up to four words of date re being transferred, the number being specified by the coding of lines QUAD and DPFM. |
| RDAA | The read data accepted line, as mentioned in connection with the programmable interface, extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor to synchronize the operations of each memory module from a common system clock source. |

Figure 5E:
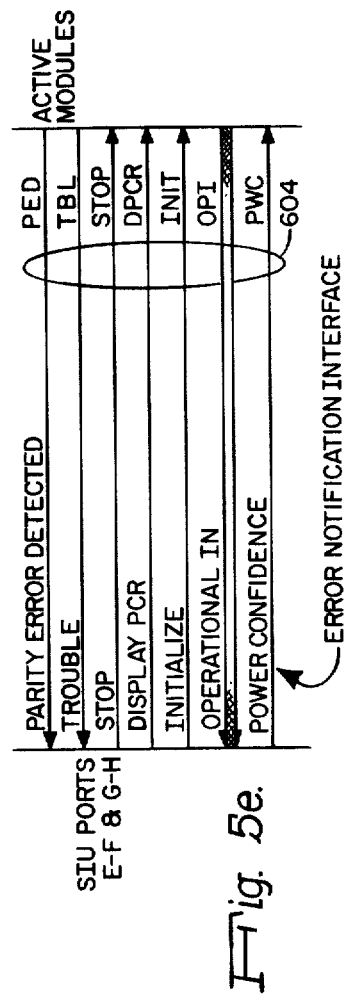
FIG. 5e shows the lines which comprise an error notification interface in FIG. 1.
Figure 6:
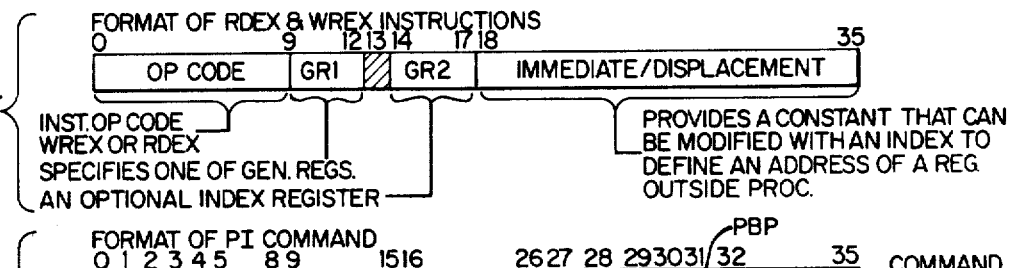
FIG. 6 illustrates the format of WREX and RDEX program instructions.
Figure 7A:
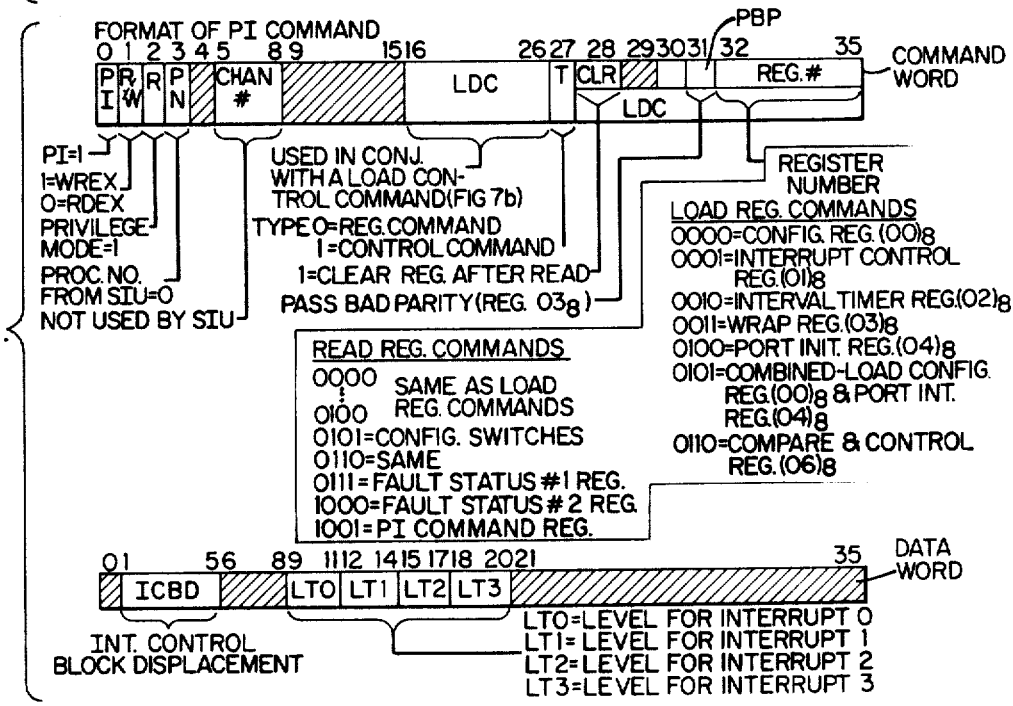
FIGS. 7a through 7c illustrate the formats of interface commands.
Figure 7B:
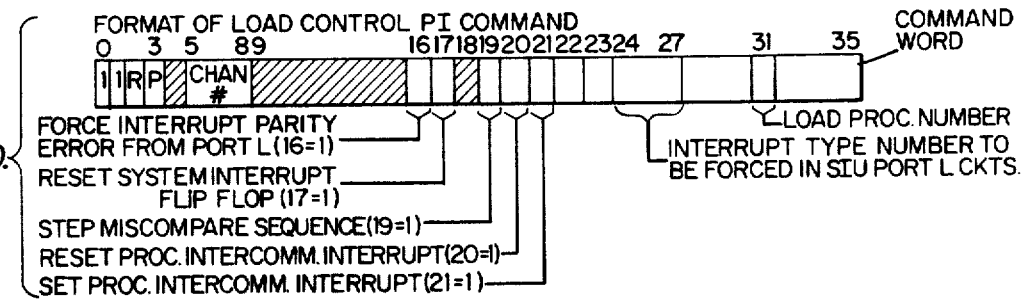
Figure 7C:
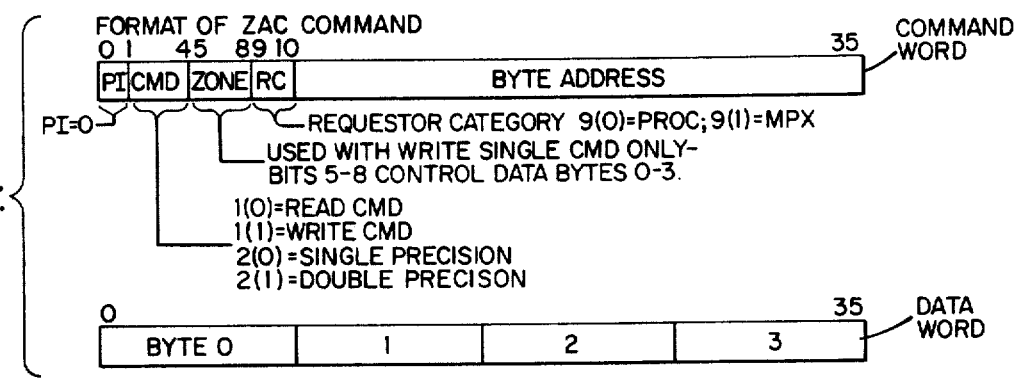

A last set of interface lines is shown in FIG. 5e. In accordance with the present invention, several of these lines signal certain conditions as for example error conditions and operational conditions. More importantly, these lines enable the SIU 100 to control the operation of the processor pair in accordance with the present invention.

As seen from FIG. 5e, the interface includes a display PCR line (DPCR), a prity error detected line (PED), a trouble line (TBL), a STOP line, an initialize line (INIT), and an operational in line (OPI) and power confidence line (PWC). The description of the interface lines is given herein in greater detail.

| ERROR NOTIFICATION INTERFACE LINES | |
|---|---|
| Designation | Description |
| DPCR | The display process control register (DPCR) line is a line from the SIU 100 to the attached input/output processor whose state indicates that the contents of the PCR register of the input/output processor should be gated onto the data lines to the SIU 100. This line is activated in response to a WREX instruction to SIU 100 and deactivated in response to any RDEX instruction directed to SIU 100. |
| PED | The parity error detected line is a single line which is coded to indicate to the SIU 100 the logical "OR" of all the parity error detector circuits internal to the attached I/O processor. This line is used by the SIU 100 as an indication that a level zero interrupt is to be issued to the processor. |
| TBL | The trouble line, when set by the processor, notifies the SIU 100 that it has encountered an exception condition while in level zero or a time-out during the self test. |
| STOP | A line from the SIU 100 to a module which, when set, indicates that the module should cease all activity. |
| INIT | A line from SIU 100 to a module which, when set, causes the module to assume |

| ERROR NOTIFICATION INTERFACE LINES | |
|---|---|
| Designation | Description |
| | the initialized state. |
| OPI | A set/complement pair of lines to the SIU 100 from a module. The pair is coded to indicate when the module is active, is powered up, and is ready to generate or accept commands. |
| PWC | A line from SIU 100 to a module which indicates that DC power (−3.3 volts) is stable. It is intended that each module use this information to degrade gracefully. |

Having described the different types of interfaces utilized by the modules of FIG. 1, each of the modules pertinent to the understanding of the present invention will now be described in greater detail.

Detailed Description of Input/Output Processor 200

Figure 2:
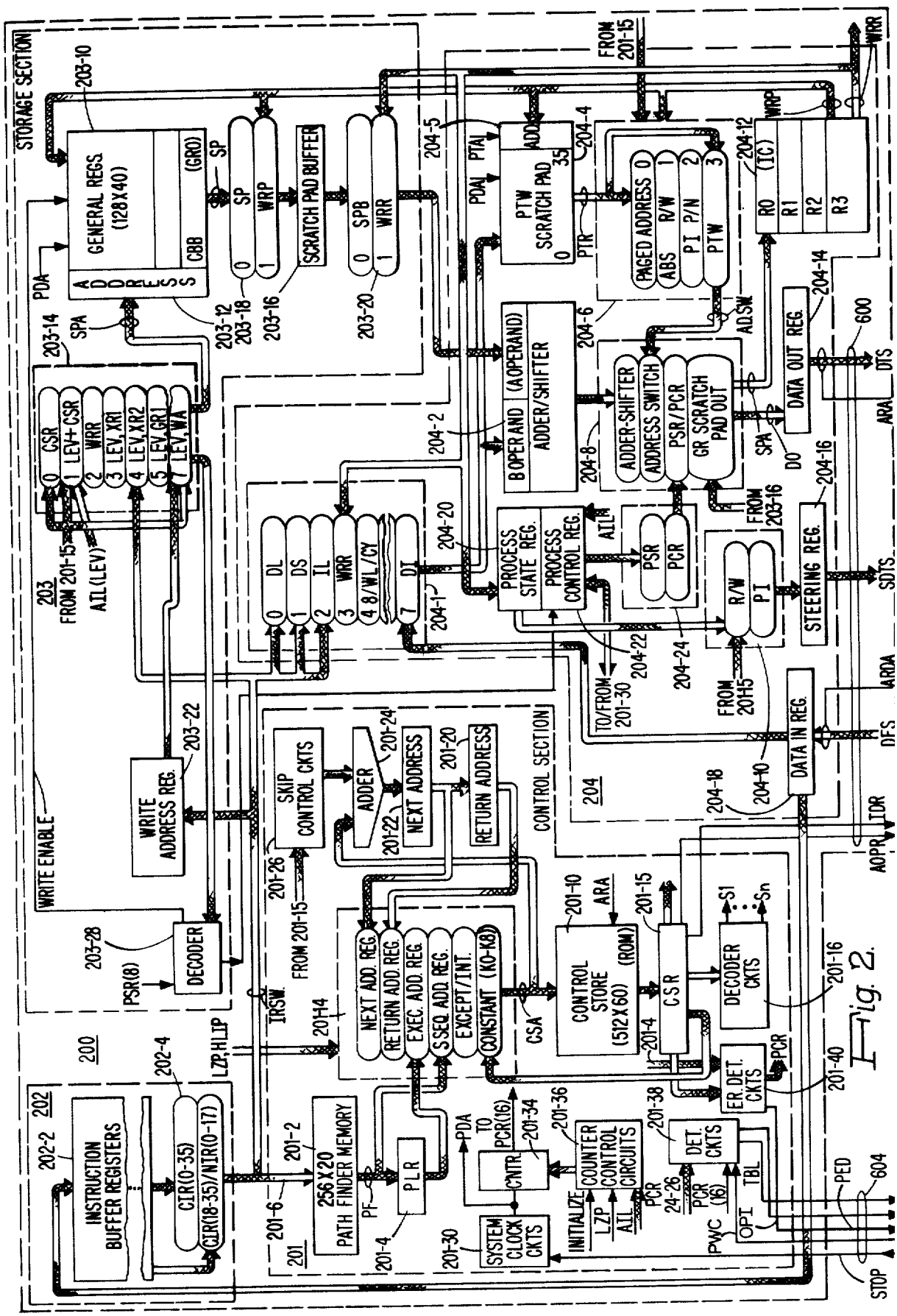
FIG. 2 illustrates in greater detail, an input/output processing unit of a processor pair of FIG. 1.

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10.

Control Store Section 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position is process control register 204-22.

Timing signals, designated as PDA in FIG. 2, required for establishing appropriate memory cycles of operation for control section as well as timing signals for operating other sections of processor 200 and the other modules of the system of FIG. 1 are provided by clock circuits included within a block 201-30. The clock circuits receive as an input the STOP line which, when in a binary ONE state, inhibits further operation of control section 201. The block 201-30 includes circuits for signalling the SIU 100 via the OPI line that the processor 200 is operational. For the purposes of the present invention, the clock circuits as well as the other circuits of FIG. 2 can be considered conventional in design and can, for example, take the form of circuits disclosed in the publication titled "The Integrated Circuits Catalog for Design Engineers", by Texas Instruments Inc., printed 1972. More specifically, the clock circuits can comprise a crystal controlled oscillator and counter circuits while the switch 201-14 can comprise a plurality of data selector-multiplexer circuits.

From the above, it is seen that, as in most microprogrammed control machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al., which is assigned to the assignee of the present invention. Reference may also be made to other ones of the documents referenced in the introductory portion of the specification.

Instruction Buffer Section 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

Storage Section 203

As seen from FIG. 2, this section comprises a scratch pad memory containing eight sets or groups or registers associated with eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the 16 registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9–12 or bits 14–17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset in a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GRO) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2–14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level O) which is never altered, stores the control block base information. The interrupt control block (ICB) tables include 256 groups of storage locations which store information for processing the tupe of interupt. The exception control block (ECB) tables include 16 groups of storage location which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) - 16 (ECB # +1). Each ECB includes values for loading the PSR, IC, and PTBR registers in addition to a saving area pointer in ECB#0 which points to a stack area for storing information pertinent to the current process before the processor 200 enters the exception routine.

The address of an interrupt control block (ICB) equals the control block base (CBB) + 16 (ICB#). The ICB# is obtained from the interrupt word as explained herein. Similarly, the ICB is a four word block and it contains values for the PSR, IC, GR14, and PTBR registers.

Processing Section 204

This section performs all of the arithmetic and logic operations required to process program instructions. The section 204 includes an adder/shifter unit 204-1 capable of performing arithmetic, shift, and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20, as mentioned, is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of exceptions which include the following.

| PCR BIT POSITION | EXCEPTION TYPE |
|---|---|
| 0 | Operation not complete; no response from SIU on lines ARA or ARDA. |
| 1 | Page address bounds fault (key check). |
| 2 | Page access fault. |
| 3 | Page not resident in memory. |
| 4 | Illegal operation (invalid instruction, illegal slave instruction, or illegal slave operation). |
| 5 | Process timer run out. |
| 6 | Overflow. |
| 7 | Lockup fault. |
| 8 | Address misalignment. |

The term "fault" does not necessarily mean the occurrence of a hardware failure, but includes programming errors, etc.

Bit positions 9-12 store the parity errors detected per data path substrate. Bit position 13 indicates when a parity error is detected in the Data In register. Bit positions 14-15 store indications of parity errors detected per control store and pathfinder memory. Bit 15 signals no response to the level zero interrupt present. Bit positions 23-26 identify the processor number and level received from the PNID and AIL lines. Bit position 27 is an interrupt inhibit bit position while bit positions 28-35 store interrupt request bits which, when set to a binary ONE, indicate an interrupt request to a level corresponding to the bit position (i.e., bit 28 = level 0). The bit positions 26-35 are loaded by program instruction from the bank of registers of block 204-12 via output bus WRR. Bit position 35 is always set to a binary ONE.

The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

In the case of a PI command, the steering information is generated as follows: bit 0 is forced to a binary ONE for a PI command; bits 1-4 correspond to bits 0-3 of register 204-20; and bits 5-6 correspond to bits of one of the fields of the microinstructions which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table word storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selector switch 204-6 are used to provide the memory or PI command. More specifically, positions 0 and 1 of address switch 204-6, when selected by an address control field of a microinstruction word stored in register 201-15, generates the R/W memory command information which includes bits 0-8 coded in accordance with predetermined fields of the microinstruction word and bits 9-35 coded to correspond to either paged address information from memory 204-4 (position 0) or absolute address bits applied to output bus WRP by the working registers of block 204-12 (position 1). When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or sub-channel within the module, bit 3 is coded to specify the processor pair number supplied by the SIU 100, bit 4 is a ZERO and bits 9-35 equal bits 9-35 of bus WRP which correspond to the absolute address of the PI command.

Error Detection Circuits 201-32—FIG. 2

In addition to the above described circuits, each IOP processor includes error detection circuits conventional in design, such as parity check circuits, which perform checks on the various storage sections of each input-/output processor as explained herein. The block 201-32 also supplies signals to the various lines of interface 604 as explained herein.

Although shown as a single block, it will be appreciated that the parity generation and check circuits are located at various points throughout the processor 200. For example, the four parity bits for data stored in general register locations of scratch pad 203-10 are generated by circuits connected to the input bus to the scratch pad 203-10. Parity circuits connected to SPB register output check the output signals for correct parity. Similarly, parity generation circuits generate parity for signals at the output of B operand switch 204-1 to be written into the PTW scratch pad 204-4. The parity of each byte read out from PTW scratch pad 204-4 is checked by parity check circuits located at the input to address switch 204-6.

Additionally, the control store 201-10 and pathfinder memory 201-2 include parity check circuits for detecting the presence of single bit failures in memory locations. The occurrence of an error sets the corresponding control store bit (i.e., bit positions 14-15) of PCR register 204-22. Further, parity circuits connected to the Data In register 204-18 check all data and instructions clocked into the Data In register 204-18. A parity error detected on data from the SIU 100 sets the corresponding substrate parity error bit (i.e., bit positions 9-12) for the bad byte and the Data In bit position 13 of PCR register 204-22.

The block 201-32 includes OR logic circuits which are connected to receive signal indications of the parity error bits stored in PCR register 204-22. One group of these circuits provides a resultant signal to line PED which corresponds to the logical OR of the parity error signals.

Counter and Detector Circuits

Another group of circuits includes the circuits of blocks 201-34, 201-36, and 201-38. Block 201-34 includes a nine stage counter, conventional in design, controlled by the circuits of block 201-36. The counter serves as a "level zero" timer which detects when processor 200 does not respond to an interrupt request within a period equal to twice the operation not complete time interval.

In greater detail, the counter is initialized to a zero state by the circuits of block 201-36 as long as the LZP line remains at a binary ZERO. When the LZP line switches to a binary ONE, the circuits of block 201-36 remove the initialize signal and the counter starts running or increases its count by one in response to each PDA signal from the circuits of block 201-30. When it reaches a maximum count (all binary ONES) and the AIL lines still have not been switched to a ZERO state, the counter generates an output which forces bit position 16 of the PCR register 204-22 to a binary ONE.

The incrementing of the counter of block 201-34 is stopped by the circuits of block 201-36 when either the AIL lines are switched to ZERO or the LZP line is switched to ZERO by SIU 100. The signals also initialize the counter. Lastly, the circuits 201-36 apply the signals on the INIT line as an input to switch 201-14. When the SIU 100 forces the INIT line to a binary ONE, this initializes or clears the contents of the various registers within the processor 200 (i.e., PCR register 204-22). When reset, the processor 200 begins exectuion of an initialization routine in control store 201-10.

The circuits of block 201-38 include several OR and AND gates. These circuits are used to force the TBL line to a binary ONE. The TBL line is forced on when bit position 16 of the PCR register 204-22 has been set as a result of a "time out" prior to the SIU switching of the processor 200 into level zero. That is, signals corresponding to bit position 16 and the level bit positions 24-26 are "ANDed" such that the TBL line is switched on when bit position 16 is a binary ONE and the PCR bits indicate that the processor is not in level zero. Another group of circuits provide a logical OR of the exception bit signals stored in PCR register 204-22 (i.e., bit position 0-8). The output is then ANDed with the level bits 24-26 of the PCR register 204-22. Thus, when the processor has been switched to level 0, any one of the exception signals forces the TBL line to a binary ONE. However, prior to the processor 200 being switched to level zero, exception signals are inhibited from switching the TBL line to a binary ONE. The reason for this is that during an initial self test operation, the time that an error occurs there could already be an exception signal stored in the PCR register 204-22 and it is desirable that this not be detected as a trouble indication. That is, a specific test (self test) is used to establish trouble indications, as explained herein.

Figure 4B:
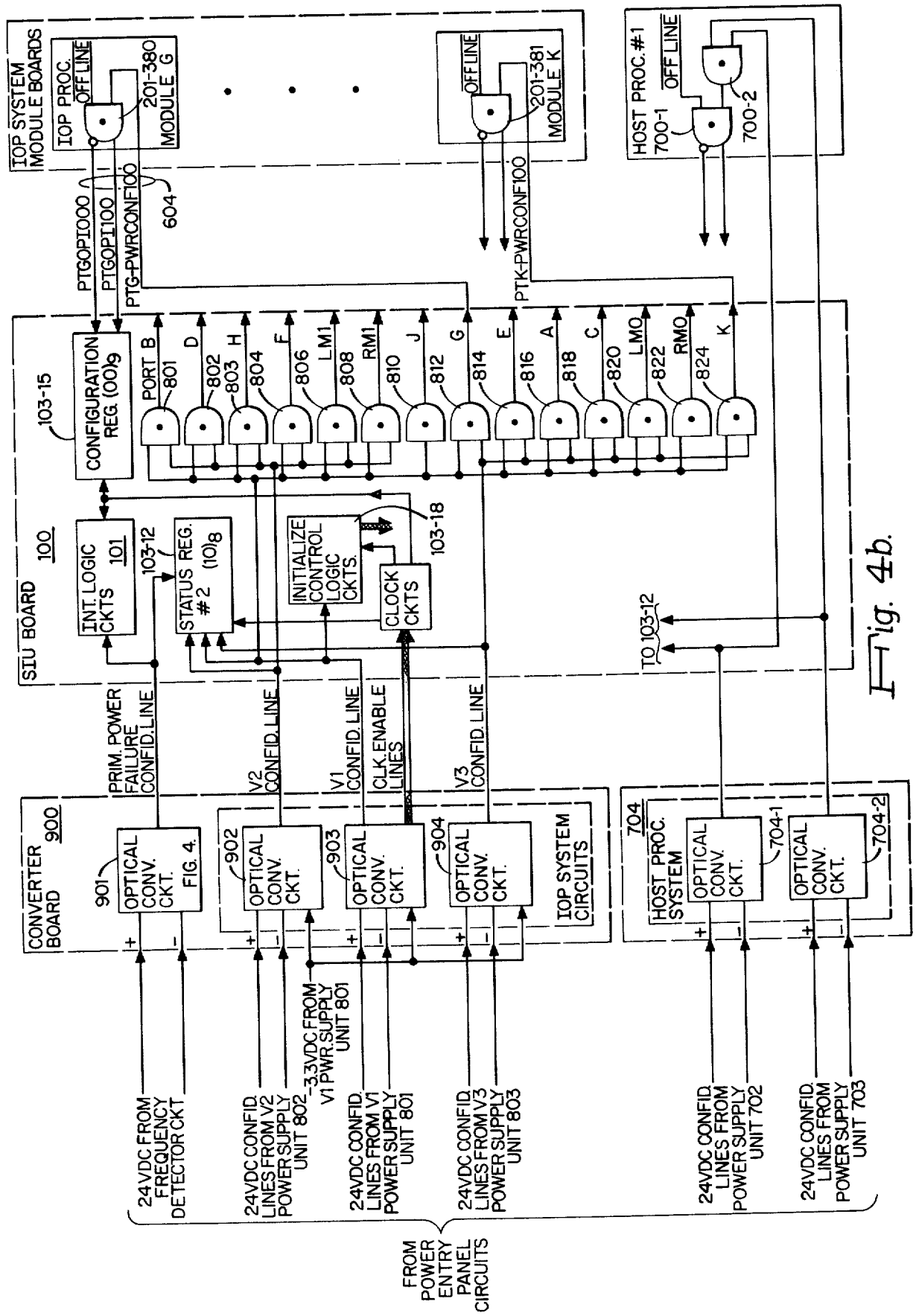

Additionally, the circuits of block 201-38 include an NAND/AND gate 201-380 shown in FIG. 4b which receives a power confidence signal from SIU 100 via the PWC line of interface 604. The power confidence signal PTEPWRCONF100 is "ANDED" with a signal OFFLINE which is provided by logic circuits not shown. The OFFLINE signal when a binary ONE indicates that the module has not been switched to an off line module of operation. The circuits 201-38 provide output complementary signals to the OPI lines for indicating when the module is powered up.

DETAILED DESCRIPTION OF SYSTEM INTERFACE UNIT 100

Interrupt Section 101

Figure 3A:
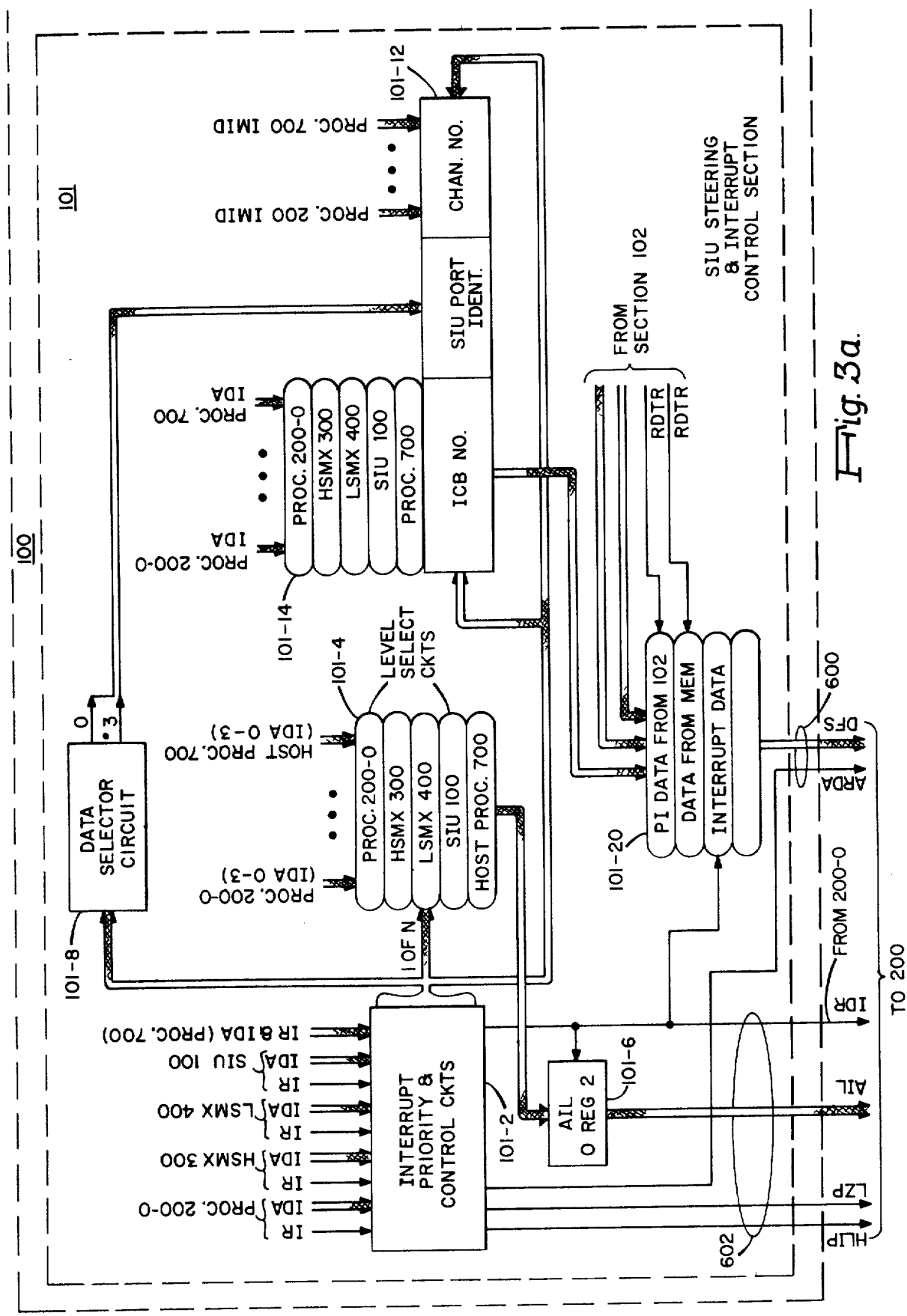
FIGS. 3a through 3c show in greater detail, the system interface unit 100 of FIG. 1.

The system Interface Unit 100, as mentioned, provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LM0, A, E, G, and J, each of which applies signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor pair 200-0 referred to herein as processor 200 when there is a request having a priority higher than that of the process being executed. When processor 200 signals that it is able to accept the request, the SIU 100 gates the identifier information associated with the highest priority request to processor. The identifier information includes an eight bit interrupt control block number including a parity bit, a three bit interrupt level number and a one bit processor number with a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G, port H; port J and port K.

This means that in the system of FIG. 1 the port of the current process has the highest priority followed by the SIU 100, the high speed multiplexer 300, the host processor 700, the processor 200, and the low speed multiplexer 400.

The priority circuits of block 101-2 are operative to generate an output signal on one of $n$ number of output lines, $n$ corresponds to the number of interrupting modules within the system. The $n$ output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LM0 |
| 0001 | port K |
| 0010 | SIU 100 - port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

Data Transfer Section 102

Figure 3B:
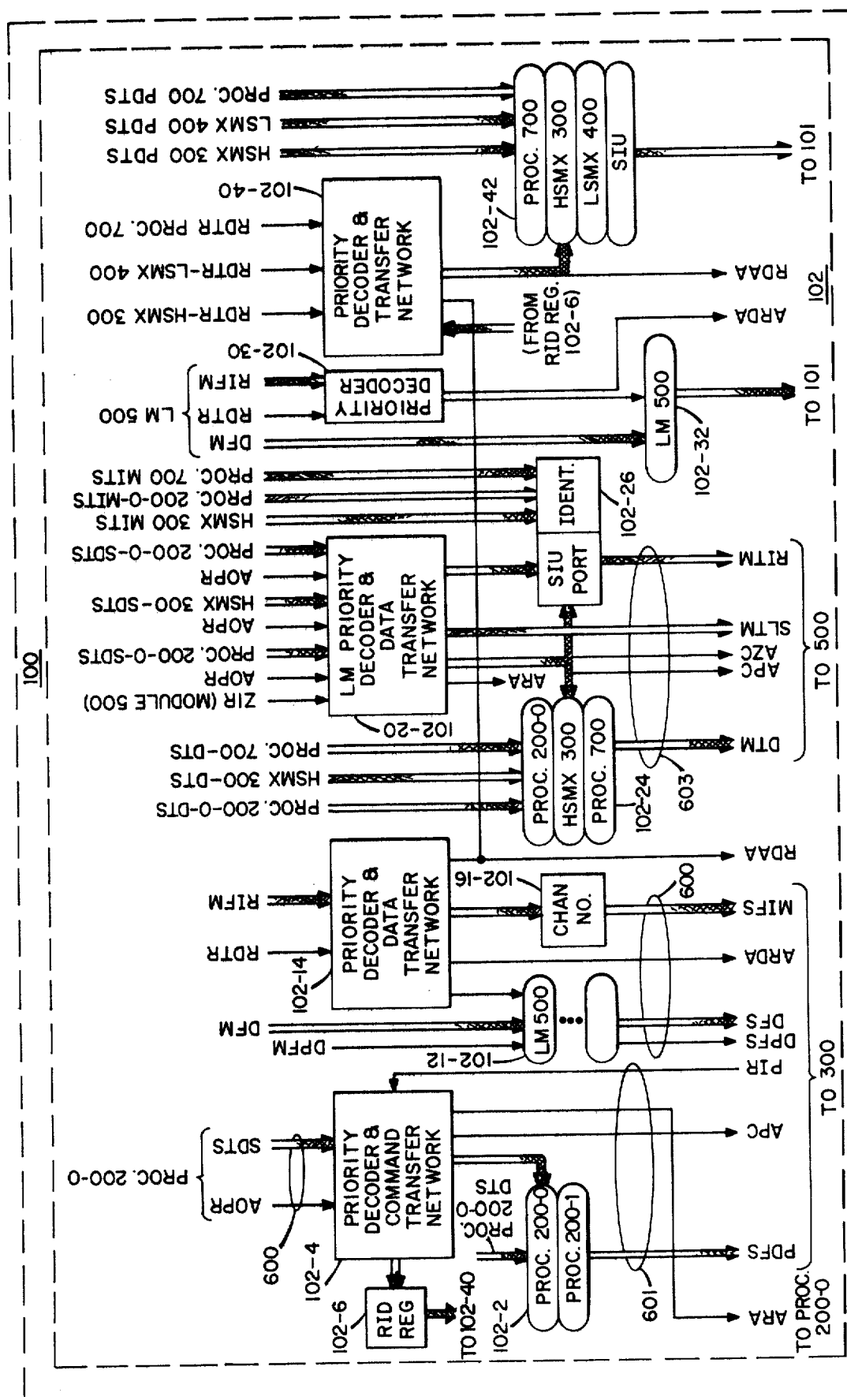

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desires to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted by memory module 500.

An arrangement similar to network 102-14 is used by SIU 100 to transfer PI and memory commands from any one of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700, and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During a next cycle of operation, the network 102-40 forces the RDAA line to a binary ONE signaling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

Control Section 103

Figure 3C:
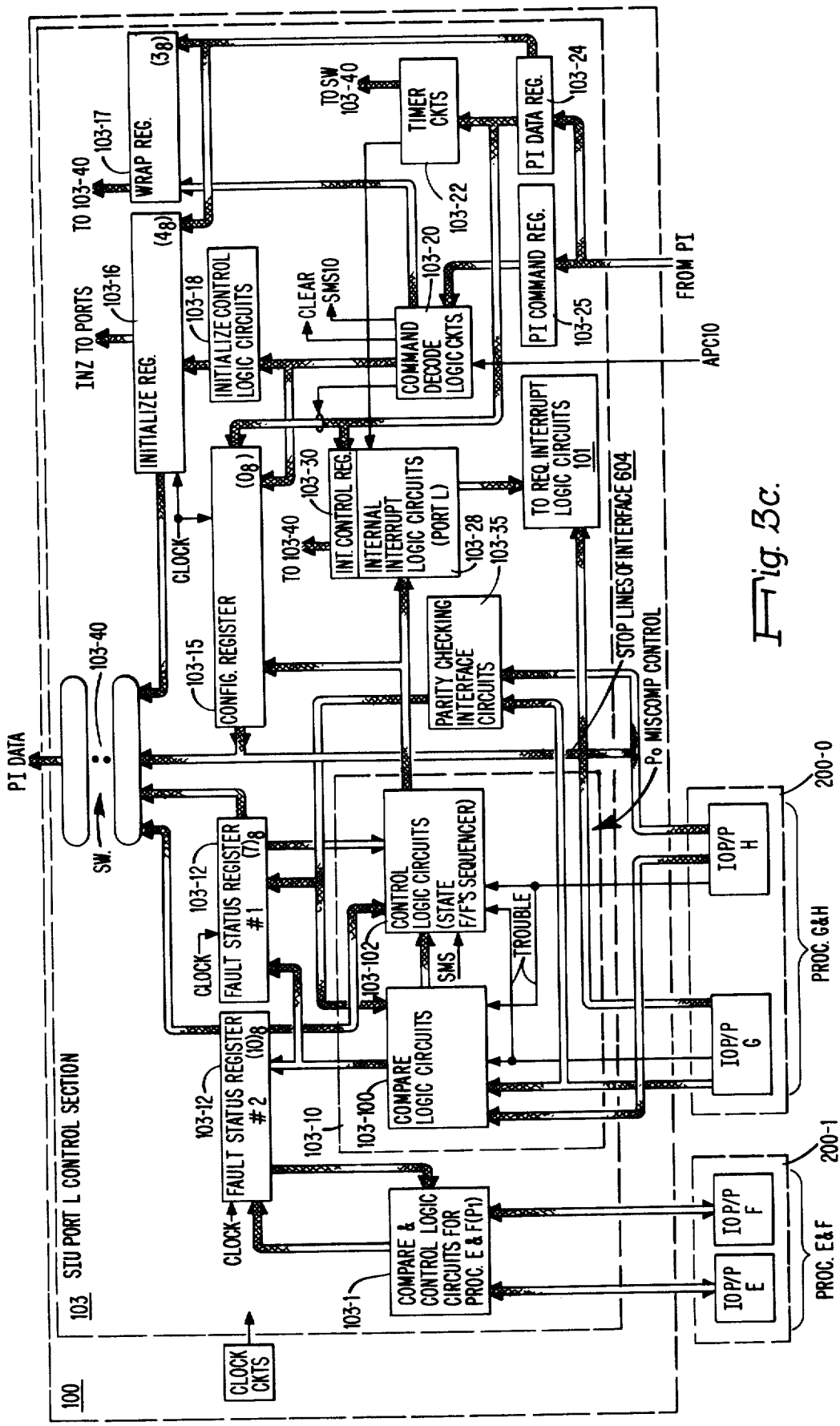

FIG. 3c shows in block diagram form section 103 of the system interface unit 100. This section includes compare and control logic circuits 103-10 and 103-11 for logical processor pairs 200-0 and 200-1. Since these circuits are duplicated for each processor pair, only one is shown in detail herein (i.e., FIG. 3d). Also included are the circuits of blocks 103-20, 103-24, and 103-25 which connect to a PI interface 603 and interpret and execute PI commands directed to the SIU internal logic circuits through port L.

As seen from FIG. 3c, the internal logic circuits in addition to the circuits which process PI commands include an internal interrupt control register 103-30 which feeds internal interrupt logic circuits 103-28. These circuits in construction are similar to the priority interrupt logic circuits 101 shown in FIG. 3a. The internal interrupt logic circuits 103-28 generate eight types of interrupts. The interrupt types pertinent to the present invention are as follows:

1 = interval timer exhaust generated by the interval timer counting through zero;
4 = processor error, detected with no mis-compare;
5 = mis-compare error detected along with a processor error; and,
6 = mis-compare error with no other errors existing.

The interrupt priority within port L is based on type number and the priority is as follows:

| Type | | |
|---|---|---|
| 4 | — | highest |
| 5 | | |
| 6 | | |
| 7 | | |
| 0 | | |
| 1 | | |
| 2 | | |
| 3 | — | lowest |

The interrupt types 4–7 are hardwired to level 0 while the interrupt levels for other types (i.e., 0, 1, 2, and 3) are programmable using the coded level signals stored in interrupt control register 103-30. The circuits 103-28 establish the interrupt having the highest priority and generate appropriate request signals which are applied to the interrupt logic circuits 101. The format of the request is shown in FIG. 12. As mentioned, the circuits 101 report the interrupts to the designated input/output processor pair.

The SIU internal logic circuits, in response to an RDEX instruction to port L, enable the contents of different ones of the registers 103-12 through 103-17, register 103-30, and timer 103-40 to be read via a multiposition selection switch 103-40. The configuration register 103-15, assigned octal address 0, stores identifier information and the operational status of all SIU ports. It is formatted as shown in FIG. 8a. The interval timer 103-40 which, for the purpose of the present invention, can be considered conventional in design includes a 24 bit register assigned octal address 2 for storing a count defining a particular time interval. The wraparound register 103-17, assigned octal address 3, is a working register used by test and diagnostic routines.

The initialize register 103-16, assigned octal address 4, stores indications for selectively initializing and masking SIU ports. Initializing takes place in response to signals generated by initialize control logic circuits of block 103-18. That is, the register 103-16 is loaded via a WREX instruction and the initialize bit positions are reset by the circuits 103-18, as explained herein. The masking operations take place in a similar fashion and are not pertinent to the present invention. The format of the register is shown in FIG. 8b.

The fault status registers 103-12 and 103-14 are assigned octal addresses 10 and 7, respectively. Fault status register #1 is a 36 bit register used to signal all errors detected by SIU 100 with the exception of processor or memory reported errors. The storage of information relating to an error condition "locks" the register to the first detected error until it is cleared via an RDEX instruction (PI command). It is formatted as shown in FIG. 8c. Fault status register #2 is also a 36 bit register used to signal all processor miscompare errors and any other faults not stored in fault status register #1. In accordance with the teachings of the present invention, fault status register #2 also includes a number of power confidence bit positions which are used for indicating the status of each of the different power supply circuits utilized in the system of FIG. 1. The letters "H" and "T1" refer to the particular locations of the various power supply units illustrated in FIG. 4a. The register also includes additional bit positions for future expansion. It is formatted as shown in FIG. 8d.

As seen from FIG. 3c, section 103 also includes parity generation and checking circuits of block 103-35. These circuits, for the purpose of the present invention, may be considered conventional in design. They generate parity check bits for the signals applied to different processor interfaces by each processor and check them against the parity check bit signals furnished by the processor pairs. The results of the parity check are applied as inputs to the compare and control logic circuits associated with the processor pair. Although not shown, the parity circuits 103-35 also receive signals from the processor pair 200-1 and furnish result signals to the circuits 103-11.

FIG. 4a illustrates in diagrammatic form, the various power supply units which comprise the system of FIG. 1. The system circuits are divided into those of host processing unit 700 and those of the input/output system. As seen from the Figure, a cabinet 800 houses the input/output processing system designated location H which includes the circuits of local memory 500, SIU 100, processor pairs 200-0 and 200-1, high speed multiplexer 300 and low speed multiplexer 400. Additionally, cabinet 800 houses three separate power supply units 801, 802 and 803. The unit 801 furnishes −3.3 VDC to the circuits of the SIU 100, a configuration panel, not shown, and the system main clock circuits. Additionally, the unit 801 supplies −3.3 VDC to a converter circuit board 900 positioned adjacent the top of cabinet 800. The unit 801 has a current capacity of 300 amperes.

The unit 802 furnishes −3.3 VDC to the circuits of ports B, D, H, F, LMI and RM1 and modules associated therewith. This unit has a current capacity of 600 amperes. The last unit 803 furnishes −3.3 VDC to the circuits of ports A, C, E, G, LMO and RMO and modules associated therewith.

A cabinet 701 houses the circuits of host processor 700 designated location T1. Additionally, the cabinet 701 two separate power supply units 702 and 703 which furnish −3.3 VDC to the different portions of host processing unit 700. As shown in FIG. 4a, one unit has a current capacity of 300 amperes while the remaining unit has a capacity of 600 amperes.

For the purposes of the present invention, each of the power supply units can be considered as being conventional in design. Accordingly, each such unit includes voltage regulator circuits which apply through a separate cable a 24 VDC output voltage signal indicating the "confidence" of its power supply unit (i.e., ground = confidence; 24 V = confidence).

In each instance, the −3.3 VDC serves as the power supply voltage for the high speed low level current mode logic circuits included within the system of FIG. 1. As discussed herein, a power supply unit is considered "confident" when its output is within 10 percent of its nominal value (i.e., −3.3 VDC ± 10%).

As seen from FIG. 4a, the ac input power is applied to the circuits of a centrally located power entry panel housed in a cabinet 950. These circuits include the normal power sequencing circuits, filter networks and coupling circuits which apply ac input power to each of the power supply units. The 24 VDC output voltage from each power supply unit is applied as a power confidence input to the panel circuits. The 24 VDC level is more than sufficient in magnitude as to be detectable notwithstanding the noise and other spurious signals which may be generated by the circuits of cabinet 950. The circuits of cabinet 950 serve as the central control for the power supply units and invert and distribute the 24 VDC power confidence signals to the circuits of converter boards 900 and 701.

In the preferred embodiment, a power confidence signal from the circuits of cabinet 950 is defined as follows: a logical "ONE" = 24 VDC at 16 milliamperes and a logical ZERO = 0VDC at 0 milliamperes. As described herein, the circuitry of cabinet 950 includes a number of limiting resistors 950-1 through 950-5, each of which connect in series with a different one of the conversion circuits of converter boards 704 and 900. As explained herein, the resistance values for all of the resistors 950-1 through 950-5 are selected to provide the nominal current value of 16 milliamperes.

In accordance with the present invention, the circuits of converter boards 704 and 900 provide the necessary isolation and conversion of the 24 VDC power confidence signals to low voltage logic level signals for indicating the "confidence" of the power supply units to the system.

FIG. 4b shows schematically the generation and distribution of power confidence signals in accordance with the present invention. As seen from the Figure, the 24 VDC from each of the power supply units are applied to a different one of a number of optical converter circuits 901 through 905 via corresponding ones of the resistors 950-1 through 950-5. The optical converter circuit 901 provides a noise free logical voltage level signal to a primary failure confidence line for reliably signalling the status of the primary power supply unit. The optical converter circuit 902 provides a noise free logical voltage signal to a V2 confidence line for reliably signalling the status of the V2 power supply unit.

The optical converter circuit 903 provides several noise free logical voltage level signals to SIU 100. The first is a signal to a V1 confidence line for signalling the status of the V1 power supply unit. The next is a pair of signals to the clock enabling lines for signalling the enabling of the system clock circuits when the V1 power supply unit is deemed confident.

Another optical converter circuit 904 provides a noise free logical voltage level signal to a V3 confidence line for signalling the status of the V3 power supply unit. As indicated, each of the converter circuits 902 through 904 receive −3.3 VDC from the V1 power supply unit. This ensures that none of the power confidence lines indicate confidence when the V1 power supply unit is not operating properly. The optical converter circuits 906 and 908 provide noise free logical voltage level signals to the host processor confidence lines.

In each instance, the signals applied to the various power confidence lines are applied as inputs to the different bit positions of fault status register 103-12. The bit positions are assigned as indicated in FIG. 8d. The signal from the primary power failure confidence line is also applied as an input to the interrupt logic circuits 101 of FIGS. 3b and 3c. The 24 VDC signal is generated by a frequency detector circuit at a motor generator set, not shown, upon the occurrence of an ac power failure. Accordingly, when primary power fails (ac power), the 24 VDC from the power supply unit falls to 0VDC approximately 100 milliseconds later. This causes the generation of a high priority interrupt (level 0, type 7) to processor 200-0. This enables the processor 200-0 to safestore the contents of various registers as well as setting to a binary ONE bit position 23 of fault status register 103-12 as seen from FIG. 8c.

The signal applied to the V2 confidence line is also applied as one input to a group of AND gates 801 through 808. Each of these gates also receive as a second input, the signal from the V1 confidence line. The gates AND the two confidence signals, and apply the resulting signal to the PWR line of corresponding ones of the modules connected to ports B, D, H, F, LMI and RM1.

The signals from the V1 and V3 confidence lines are applied as a pair of inputs to each of a number of AND gates 812 through 824. These gates "AND" the two confidence signals and apply the resulting signals to the PWR lines of corresponding ones of the modules connected to ports G, E, A, C, LMO, RMO, and K. The AND gate 810 receives a single confidence signal from the V1 confidence line which it applies to the module connected to port J. As shown in FIG. 4b, the signals from SIU 100 are applied to NAND/AND gates included within each of the modules. The modules return a set of complement operational in signals to the OPI lines which are used to set different bit positions of configuration register 103-15. The assignment of bit positions is as indicated in FIG. 8a.

The confidence signals generated by the optical converter circuits of board 701 host processor 700 are applied to an AND gate 700-1 which connects to NAND/AND gate 700-2. The gate 700-2 provides a set of complement operational in signals to the OPI lines.

Figure 4C:
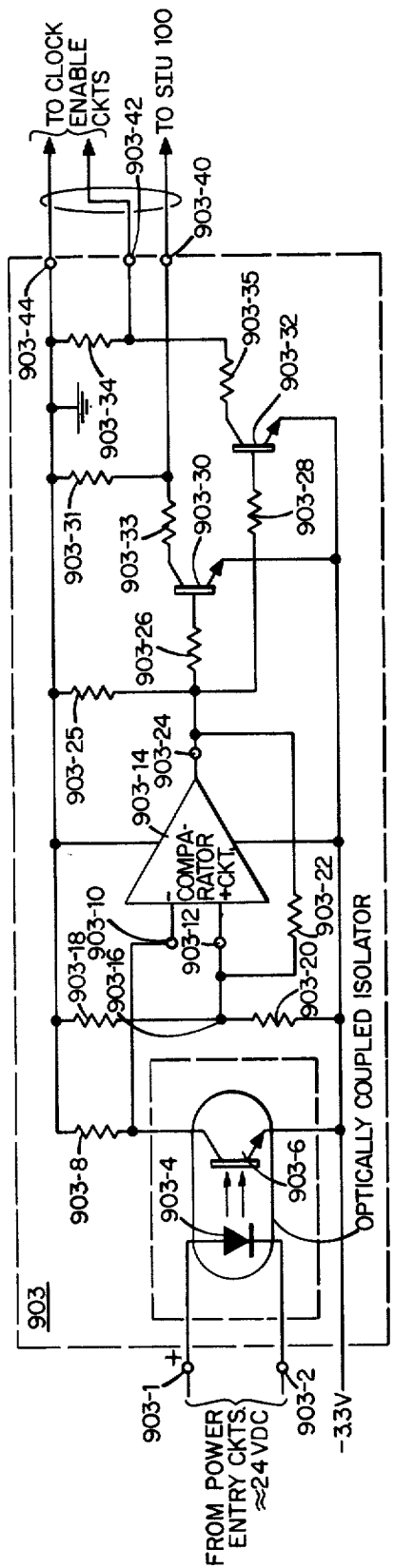
FIG. 4c illustrates in greater detail, the converter board of FIG. 4b.

In accordance with the teachings of the present invention, FIG. 4c illustrates the circuits included within each of the optical converter circuits 901 through 908. By way of example, the circuits of converter circuit 903 is selected for illustration in order to depict the additional outputs provided to the system clock circuits. Referring to the Figure, it is seen that the circuit 903 includes as an input stage, an optically coupled isolator circuit which includes a light emitting diode 903-4 and an NPN phototransistor 903-6. The anode and cathode of diode 903-4 connects in series with input terminals 903-1 and 903-2 respectively. The external resistor 950-3 in FIG. 4b establishes the current through diode 903-4 to the 16 milliampere value.

Accordingly, the resistance value for resistor 950-3 is given by the expression:

$$R = \frac{VIN\ (24\ VDC) - VD\ (1.2\ V)}{.016}$$

For the purposes of the present invention, the isolator circuit may be considered conventional in design. For example, it may utilize an optical coupler designated as circuit type TIL111 manufactured by Texas Instruments Inc. Such devices have been found useful where different parts of a system operate at different dc levels or where dc isolation is required to eliminate ground loops or reduce spurious noise. Since there exists a significant amount of noise, an isolator circuit is used to ensure the generation of a noise free signal.

The phototransistor 903-6 has its collector electrode connected to ground through a resistor 903-8. Its emitter electrode connects to the 3.3 VDC furnished by the V1 power supply unit. The output signal present at collector electrode of transistor 903-6 is applied to a negative input terminal 903-10 of a level detector circuit 903-14. A positive input terminal 903-12 connects to a junction 903-16 of a voltage divider network including resistors 903-18 and 903-20. The junction 903-16 connects to a feedback resistor 903-22 to an output terminal 903-24 of circuit 903-14. The other terminals of the circuit 903-14 connect to ground and −3.3 VDC as shown. The positive feedback from the output terminal to the input terminal produces a hysteresis effect in the circuit and causes the level detector 903-14 to have a rapid output transition when it switches. This prevents the possibility of unwanted oscillation during the transition period. More specifically, the reference voltage at terminal 903-12 is set at −1.83 VDC. The amount of feedback through resistor 903-22 causes a change of ± 10 millivolts dc in the reference voltage.

For the purposes of the present invention, the level detector circuit 903-14 may be considered conventional in design and may be constructed from a circuit designated LM339D manufactured by National Semiconductor Inc. The level detector circuit 903-14 or Schmitt trigger circuit operates to switch its output from −3.1 VDC to −0.88 VDC when the voltage applied to terminal 903-10 is more negative than the reference voltage on terminal 903-12.

The output signal developed across output load resistor 903-25 is applied in parallel to the base electrodes of a pair of CML converter circuits which comprise NPN driver transistors 903-30 and 903-32, base resistors 903-26 and 903-28 and collector resistors 903-31 through 903-35. The collector electrodes of each of the driver transistors 903-30 and 903-32 connect to ground through the pair of collector resistors 903-31, 903-33 and 903-34, 903-35 as shown.

The junctions 903-36 and 903-38 formed by these resistors connect to the converter circuit output terminals 903-40 and 903-42. The terminal 903-40 connects the V1 power confidence line while the other terminal connects to the clock circuits. The clock circuits also connect to the ground terminal 903-44 of circuit 903. The emitter electrodes of the transistors 903-30 and 903-32 connect to the −3.3 VDC reference voltage. The circuits including transistors 903-30 and 903-32 operate to convert the level detector 903-14 output levels to the CML low voltage levels utilized by the current mode logic circuits of the system of FIG. 1.

In accordance with the preferred embodiment, a logical or binary ONE has a value of −0.5 VDC while a binary ZERO has an OVDC value. Accordingly, when the comparator circuit 903-14 switches its output terminal from a −3.1 VDC to −0.88 VDC this causes transistors 903-30 and 903-32 to switch from an off condition to an on condition. This causes the terminals 903-40 and 903-42 to switch from OVDC to −0.5 VDC indicating that the V1 power supply unit is power confident as explained herein.

As mentioned, each optical converter circuit is identical to the circuit of FIG. 4c. By way of illustration only, the following table provides a list of resistor circuit values included within the circuit of FIG. 4c.

| Element | Value |
|---|---|
| resistor 903-8 | 1.5 K ohms |
| resistor 903-18 | 15 K ohms |
| resistor 903-20 | 12 K ohms |
| resistor 903-22 | 220 K ohms |
| resistor 903-25 | 1 K ohm |
| resistor 903-26 | 5.6 K ohms |
| resistor 903-28 | 2.7 K ohms |
| resistor 903-31 | 75 ohms |
| resistor 903-33 | 360 ohms |
| resistor 903-34 | 75 ohms |
| resistor 903-35 | 180 ohms. |

DESCRIPTION OF OPERATION

With reference to FIGS. 1 through 8d, the operation of the system of the present invention will be described. It is assumed that ac power has been applied to each of the power supply units 801 through 803 and 702 and 703 of FIG. 4a. By way of example, it is assumed that all supply units are functioning properly. Accordingly, each supply unit (regulator circuit) applies approximately a 24 VDC signal to the input terminals of each of the optical converter circuits 901 through 905 of FIG. 4b.

Each of the converter circuits 901 through 905 convert the 24 VDC confidence signal to a logical level confidence signal corresponding to a logical ONE. More specifically, referring to FIG. 4c, it is seen that the optically coupled isolator circuit is operative to apply an output voltage of approximately −3.1 VDC to terminal 903-10. This causes the level detector or Schmitt trigger circuit 903-14 to switch its output from −3.1 VDC to −0.88 VDC. Both converter transistors 903-30 and 903-32 switch into conduction causing terminals 903-40 and 903-42 to switch from a logical ZERO (OVDC) to a logical ONE (−0.5 VDC) voltage level.

As seen from FIG. 4b, the logical level signals are applied via the confidence lines to SIU 100. The signals set the different power confidence bit positions of status register 103-12 of FIG. 8d to binary ONES. The logical ONE level confidence signal applied to the V1 confidence line enables the initialize control logic circuits 103-18 to initialize the system. The logical ONE level confidence signal applied to the clock enable line enables the system clock circuits for operation at which time the system is initialized.

The logical ONE level confidence signals applied to the V2 and V3 confidence lines cause each of the AND gates 801 through 824 to force its output to a binary ONE state. The power confidence signals (PTB PWRCONF100 through PTK PWRCONF100) cause the NAND/AND gates of each module to switch its set of OPI lines. This in turn causes bit positions 9-23 of the configuration register of FIG. 8a 103-15 to switch to binary ONES. This indicates that all of the modules are operational and therefore may be used in the system.

As indicated previously, the contents of bit positions 31-35 designate which ones of the input/output processor pairs are to be enabled for operation. It will be assumed that processor pair 200-0 has been enabled. The system configuration is established when it is initially bootloaded. For further information about such loading, reference may be made to the patent application entitled "Automatic Reconfiguration Apparatus for Input/Output Processor" cited in the introductory portion of this specification.

It will be noted that the different types of modules of the system are duplicated. Accordingly, the system is able to reconfigure the modules upon the occurrence of failure including power failure and thereafter continue operation in a degraded mode. For example, it will be assumed that the power supply unit 802 fails. When this happens, the unit 802 causes an immediate loss in the 24 VDC applied to the power confidence lines. Referring to FIG. 4c, it is seen that the optical converter circuit 903 causes the voltage level applied to terminal 903-10 to switch to OVDC. This causes the level detector circuit 903-14 to switch its output from −0.88 VDC to −3.1 VDC turning off transistor 903-30. The V2 confidence line signal switches from a logical ONE level (0.5 VDC) to a logical ZERO level (OVDC). This results in bit position 15 of status register 103-12 being switched from a binary ONE to a binary ZERO state signalling the system that the V2 power supply unit has failed.

As seen from FIG. 4b, the OVDC signal applied to the V2 confidence line disables AND gates 801 through 808. This, in turn, switches the power confidence signals PTBPWRCONF100 through PTRM1PWRCONF100 from binary ONES to binary ZEROS. The result is that there is a corresponding change of state in the OPI lines associated with the modules connected to ports powered by the V2 power supply unit 902. Accordingly, the bit positions 10, 12, 14, 16, 20 and 22 of register 103-15 switch from binary ONES to binary ZEROS.

As explained previously, during normal operation, the SIU compare logic circuits 103-100 of FIG. 3c operate to compare the states of the different interface lines associated with processing units G and H. One of the sets of lines designated miscellaneous lines include the OPI lines of each processing unit. Accordingly, the change in state of the OPI lines from processing unit H cause the compare circuits 103-100 to switch bit positions 1 and 5 of status register 103-12 of FIG. 8d to binary ONES. This results in the control circuits 103-12 conditioning the internal interrupt circuits 103-28 to generate a level 0 type 5 interrupt to processing unit G and the deconfiguration of processing unit H from the system.

Upon receipt of the interrupt signal, the processing unit G is operative to execute a RDEX instruction. This generates a PI read command having the format of FIG. 7c which is coded to read the contents of fault status register 103-12. Upon receiving the contents of the register 103-12 from SIU 100, the processing unit G readily establishes that the miscompare error was caused by the failure of the V2 power supply unit 802. Accordingly, it notifies the operating system of the failure where after processing can continue at a degraded mode utilizing the operative modules.

It will be appreciated that by contrast a failure in power supply unit 901 prevents further system operation since this unit is essential to the operation of SIU 100. Accordingly, upon such failure, the optically coupled converter circuit 901 is operative to switch the signals applied to the V1 confidence line and clock enable lines from logical ONE levels to logical ZERO levels. This, in turn, inhibits further system operation by inhibiting operation of the system clock circuits and the initialize control logic circuits 103-18. Also, the state of bit position 14 of status register 103-12 is switched from a binary ONE to a binary ZERO. This indicates to maintenance personnel the cause of failure.

A failure in one of the power supply units powering host processing unit 700 causes a sequence of events similar to those described above. That is, a failure causes one of the bit positions of status register 103-12 and configuration register 103-15 to switch from a binary ONE to a binary ZERO. Where the host processing unit is duplicated, the sequence of operations for detecting a power failure is similar to that described in connection with IOP processing unit G. For further information regarding such sequencing, reference should be made to the patent application entitled "Input/Output Processing System Utilizing Locked Processors" referenced herein.

From the foregoing, it is seen that the present invention provides a reliable power confidence system which facilitates diagnosis of power supply unit failures and recovery therefrom. In accordance with the present invention, the system includes a number of optically coupled isolator circuits which provide noise free isolated logical level signals compatible for use with the low power high speed logic circuits of the system.

It will be appreciated that many modifications may be made to the preferred embodiment of the present invention. For example, the voltage values, the formats of the various registers may be changed. Also, it will be obvious to those skilled in the art that the number of power supply units may be increased, etc.

While in accordance with the provisions and statutes there has been illustrated and described the best forms of the invention known, certain changes may be made to the system described without departing from the spirit of the invention as set forth in the appended claims and, in some cases, certain features of the invention may be used to advantage without a corresponding use of other features.

What is claimed is:

1. A data processing system including a plurality of modules constructed of high speed low level circuits mounted on a number of circuit boards, said plurality of modules including a plurality of processing unit modules, a system interface unit having a plurality of interface ports, each port being connected to a different one of said modules, said system interface unit being constructed of high speed low voltage circuits mounted on another circuit board and a plurality of regulated power supply units for powering said high speed low voltage level circuits of different ones of said circuit boards and each including means for generating an initial power confidence signal and reference potential signal, said system further including a power confidence system comprising:

a plurality of optically coupled isolator converter circuits, each having an input circuit coupled to receive said initial power confidence signal and reference potential signal from a different one of said regulated power supply units, and an output circuit connected to said input circuit, said converter circuit converting said initial power confidence signal into a noise free ground isolated low voltage logical level power confidence signal compatible with logic voltage levels and reference potentials of said high speed low voltage level circuits;

a plurality of registers included in said system interface unit, a first one of said registers being connected to said plurality of optically coupled isolator converter circuits, said first register being conditioned by said low voltage power confidence signals to store coded signals individually designating the confidence status of each of said plurality of power supply units for reference by any one of said plurality of processing unit modules.

2. The system of claim 1 wherein said one register includes a plurality of bistable bit positions corresponding in number to said plurality of regulated power supply units, circuit means connecting each bistable bit position to receive said confidence signal from said output circuit of a different predetermined one of said plurality of optically coupled isolator converter circuits and said each bistable bit position being operative in response to said power confidence signal to switch from a first to a second state for designating said confidence status of a predetermined one of said plurality of regulated power supply units.

3. The system of claim 1 wherein a second one of said plurality of said registers is coupled to each of said modules, said second register including a plurality of bistable stages for storing coded signals designating which ones of said modules are enabled for operation; and, logic means included in each of said plurality of modules, said logic means being connected to said second register and said logic means of predetermined ones of said modules being connected to receive an output low voltage power confidence signal indicative of the power confidence of the module connected to one of said plurality of ports, said logic means being operative in response to said low voltage power confidence signal to condition said second register to store in another stage, a signal indication specifying the operational status of said associated module.

4. The system of claim 3 wherein said system interface unit further includes a plurality of logic gating means corresponding in number to said plurality of ports, each of said logic gating means being connected to predetermined ones of said optically coupled isolator converter circuits, said each logic gating means selectively combining said low level power confidence signals from said connected converter circuits to generate said output power confidence signal indicative of the power confidence status of said module.

5. The system of claim 4 wherein each of said plurality of logic gating means includes an AND gate.

6. The system of claim 4 wherein said system interface unit includes clocking circuits for generating timing signals for enabling the operation of said system interface unit and wherein a predetermined one of said plurality of optically coupled isolator converter circuits being connected to said clocking circuits, said predetermined one of said converter circuits including means for generating another low level signal for enabling said clocking circuits only when said another low level signal is in a state indicating that the power supply unit which powers said system interface unit circuit board is power confident.

7. The system of claim 6 wherein said system interface unit further includes interrupt logic circuits for generating interrupt signals to said plurality of processing units in response to the occurrence of predetermined events, said plurality of optically coupled isolator converter circuits further including another optically coupled isolator converter circuit coupled to receive an initial power confidence signal and reference potential signal from a primary power source for said system, said output circuit of said another optically coupled isolator converter circuit being connected to apply a noise free low voltage level power confidence signal to said interrupt logic circuits and to said first register, said interrupt logic circuits and said first register respectively being conditioned by the state of said low level power confidence signal to generate an interrupt signal indicating the occurrence of a primary power failure and store coded signals designating the confidence status of said primary power source.

8. The system of claim 6 wherein said plurality of processing units includes a host processing unit, said logic means associated with said host processing unit including logic gating means for combining said power confidence signals from predetermined ones of said plurality of optically coupled isolator converter circuits connected to those power supply units used to power said host processing unit module.

9. The system of claim 6 wherein each of said logic means includes an AND gate having one input connected to receive said power confidence signal for combination with any other signals which would alter said operational status of said module, said AND gate having output terminals for applying a pair of complementary signals to said second register and a predetermined one of said stages of said second register being conditioned by said pair of complementary signals to store said signal indication.

10. The system of claim 4 wherein a number of said plurality of modules includes pairs of modules which perform identical functions, one of each of said pairs of modules being connected to be powered by a different combination of said power supply units; and, each of said plurality of logic gating means being connected to said output circuit of said predetermined ones of said optically coupled isolator converter circuits which connect to said power supply units corresponding to said different combination thereby automatically disabling those modules which are not power confident.

11. The system of claim 1 wherein said high speed low voltage level circuits include current mode logic (CML) circuits and wherein said input circuit of each of said plurality of optically coupled isolator circuits includes current sensing circuit means, phototransistor circuit means and level detector circuit switching means, said current sensing means being connected to receive said initial power confidence signal and reference potential signal from said different one of said regulated power supply units, phototransistor circuit means being optically coupled to said current sensing circuit means, said phototransistor means being conditioned by said current sensing means upon sensing a predetermined direction of current to provide an output voltage of a predetermined value and said level detector switching circuit means being connected to said phototransistor circuit means, said level detector switching circuit means being operative to switch from a first state to a second state to generate an intermediate voltage level to said output circuit upon detecting that said predetermined value of said output voltage is greater in magnitude than a predetermined reference voltage.

12. The system of claim 11 wherein said system includes circuit means connected to a predetermined one of said plurality of said regulated power supply units and to each of said plurality of optically coupled isolator converter circuits, said plurality of isolator converter circuits being connected to supply voltage and reference potential inputs from said predetermined one of said regulated power supply units.

13. The system of claim 12 wherein said predetermined one of said regulated power supply units corresponds to the unit which powers said system interface circuit board, each isolator circuit further including a voltage divider resistor network connected at one end to said supply voltage input and at the other end to said reference potential input for providing said predetermined reference voltage.

14. The system of claim 13 wherein said output circuit includes output transistor circuit stage connected to said supply voltage input, said reference potential input and to the output of said level detector circuit means, said transistor circuit stage being operative to convert said intermediate voltage level into a bilevel confidence signal compatible with said CML logic voltage levels and reference potentials.

15. The system of claim 13 wherein said level detector switching circuit means includes a feedback resistor circuit connected at one end to said voltage divider resistor network and to said output of said level detector switching circuit means, said feedback resistor circuit providing positive feedback voltage for causing rapid switching of said level detector switching circuit means without oscillation.

16. The system of claim 14 wherein said system includes clock circuits for generating timing signals for enabling the operation of said system interface unit, and said output circuit of the isolator circuit connected to said predetermined one of said regulated power supply units further including another output transistor stage connected to receive said supply voltage and reference potential inputs, said another transistor stage being operative to convert said intermediate voltage level into bilevel clock enabling signals compatible with said CML logic voltage levels and reference potentials and means connecting said another transistor stage to said clocking circuits for enabling said circuits only when said predetermined power supply unit is power confident.

17. A data processing system comprising:
 a plurality of modules constructed of current mode logic (CML) mounted on a number of circuit boards, said plurality of modules including a plurality of processing units, each module including interface means;
 a system interface unit constructed of CML circuits mounted on another circuit board, said unit including:
  a plurality of interface ports, each port including logic gating means connected to the interface means of a different one of said modules; and,
  a plurality of registers, a first one of said registers being connected to said interface means of each port;
  a plurality of regulated power supply units for powering the CML circuits of said circuit boards, each power supply unit including a regulator circuit for generating an output power confidence signal and reference potential signal much greater in magnitude than the magnitudes of the bilevel logic voltage signals utilized by said CML circuits;
  central power control circuits connected to said regulator circuits of each of said power supply units, said central power control circuits for distributing said output power confidence and reference potential signals to said plurality of modules;
  a plurality of optically coupled isolator converter circuits for converting said output power confidence and reference potential signals into said CML bilevel logic signals, said plurality being equal in number to said plurality of regulated power supply units, each isolator converter circuit being coupled to said central power control circuits and including:
   an input sensing circuit coupled to receive said output power confidence signal and said reference potential signal from a different one of said regulated power supply units; and,
   an output circuit connected to said input circuit, said first one of said registers and to said logic gating means of at least one of said plurality of ports, said output circuit being operative in response to said output power confidence and reference potential signals to apply a noise free ground isolated CML bilevel power confidence signal to said first register and said logic gating means, said first register being operative to store a coded signal designating the confidence status of one of said power supply units and said logic gating means being operative to condition one of said interface means to apply a power confidence status signal to said module connected thereto for indicating the power confidence status of all of those power supply units required to power said module.

18. The system of claim 17 wherein said first register includes a plurality of bistable bit positions corresponding in number to said plurality of regulated power supply units, circuit means connecting each bistable bit position to receive said output power confidence signal from said output circuit of a different predetermined one of said plurality of optically coupled isolator converter circuits and said each bistable bit position being operative in response to said power confidence signal to switch from a first to a second state for designating said confidence status of said one of said plurality of regulated power supply units.

19. The system of claim 17 wherein a second one of said plurality of said registers is coupled to each of said modules, said second register including a plurality of bistable stages for storing coded signals designating which ones of said modules are enabled for operation; and,
 logic means included in each of said plurality of modules, each said logic means being connected to said second register and said logic means of predetermined ones of said modules being connected to receive said CML bilevel power confidence signal from said logic gating means indicative of the power confidence of the module connected to one of said plurality of ports, said logic means being operative in response to said CML bilevel power confidence signal to condition said second register to store in another stage, a signal indication specifying the operational status of said connected module.

20. The system of claim 17 wherein said logic gating means of each port is to predetermined ones of said optically coupled isolator converter circuits, each said logic gating means logically combining said CML bilevel power confidence signals received from said connected converter circuits to generate said power confidence status signal indicative of the power confidence status of said all of said power supply units.

21. The system of claim 20 wherein a plurality of said plurality of modules includes pairs of modules which perform identical functions, one of each of said pairs of modules being connected to be powered by a different combination of said power supply units; and,
 each of said plurality of logic gating means being connected to said output circuit of said predetermined ones of said optically coupled isolator converter circuits which connect to said power supply units corresponding to said different combination thereby automatically disabling those modules connected to power supply units which are not power confident.

22. The system of claim 21 wherein said input circuit of each of said plurality of optically coupled isolator circuits includes current sensing circuit means, phototransistor circuit means and level detector circuit switching means, said current sensing means being connected to receive said output power confidence signal and reference potential signal from said central power control circuits, phototransistor circuit means being optically coupled to said current sensing circuit means, said phototransistor means being conditioned by said current sensing means upon sensing a predetermined direction of current to provide an output voltage of a predetermined value and said level detector switching circuit means being connected to said phototransistor circuit means, said level detector switching circuit means being operative to switch from a first state to a second state to generate an intermediate voltage level to said output circuit upon detecting that said predetermined value of said output voltage is greater in magnitude than a predetermined reference voltage.

23. The system of claim 22 wherein said system includes circuit means connected to a predetermined one of said plurality of said regulated power supply units and to each of said plurality of optically coupled isolator converter circuits, said plurality of isolator converter circuits being connected to supply voltage and reference potential inputs from said predetermined one of said regulated power supply units.

24. The system of claim 23 wherein said predetermined one of said regulated power supply units corresponds to the unit which powers said system interface circuit board, each isolator circuit further including a voltage divider resistor network connected at one end to said supply voltage input and at the other end to said reference potential input for providing said predetermined reference voltage.

25. The system of claim 24 wherein said output circuit includes output transistor circuit stage connected to said supply voltage input, said reference potential input and to the output of said level detector circuit means, said transistor circuit stage being operative to convert said intermediate voltage level into said CML bilevel confidence signal.

26. The system of claim 25 wherein said system includes clock circuits for generating timing signals for enabling the operation of said system interface unit, and said output circuit of the isolator circuit connected to said predetermined one of said regulated power supply units further including another output transistor stage connected to receive said supply voltage and reference potential inputs, said another transistor stage being operative to convert said intermediate voltage level into CML bilevel clock enabling signals and means connecting said another transistor stage to said clocking circuits for enabling said circuits only when said predetermined power supply unit is power confident.

27. A data processing system comprising:
at least one host processing module constructed of current mode logic (CML) circuit mounted on a number of circuit boards;
a plurality of pairs of duplicated modules connected to form an input/output system, said plurality of pairs of modules being constructed of CML circuits mounted on a number of circuit boards, one of said pairs of duplicated modules includes a pair of input/output processing units and each module including interface means;
a system interface unit constructed of CML circuits mounted on another circuit board, said unit including:
a plurality of interface ports, each port including logic gating means connected to the interface means of a different one of said modules; and,
a plurality of registers, a first one of said registers being connected to said interface means of each port;
a plurality of regulated power supply units for powering the CML circuits of different ones of said circuit boards, each power supply unit including a regulator circuit for generating an output power confidence signal and reference potential signal;
a plurality of optically coupled isolator converter circuits for converting said output power confidence and reference potential signals into CML bilevel logic signals, said plurality being equal in number to said plurality of regulated power supply units, each isolator converter circuit including:

an input sensing circuit coupled to receive said output power confidence signal and said reference potential signal from a different one of said regulated power supply units; and,
an output circuit coupled to said input circuit, said first one of said registers and to said logic gating means of at least one of said plurality of ports, said output circuit being operative in response to said output power confidence and reference potential signals to apply a noise free ground isolated CML bilevel power confidence signal to said first register and said logic gating means, said first register being operative to store a coded signal designating the confidence status of one of said power supply units and said logic gating means being operative to condition one of said interface means to apply a power confidence status signal to said module connected thereto for indicating the power confidence status of all of those power supply units required to power said module.

28. The system of claim 27 wherein said first register includes a plurality of bistable bit positions corresponding in number to said plurality of regulated power supply units, circuit means connecting each bistable bit position to receive said CML bilevel confidence signal from said output circuit of a different predetermined one of said plurality of optically coupled isolator converter circuits and said each bistable bit position being operative in response to said bilevel power confidence signal to switch from a first to a second state for designating said confidence status of a predetermined one of said plurality of regulated power supply units.

29. The system of claim 28 wherein said system interface unit further includes command register means and command decode circuit means, said command register means being connected to receive commands from said input/output processing units, said command decode circuit means connected to said command register means and operative to generate control signals in response to said commands; and,
control circuit means included in each of said input/output processing units, said control circuit means being coupled to said interface means,
said command decode circuit means being operative in response to a command from one of said pair of input/output processing units to generate a sequence of control signals for read out of the contents of one of said plurality of registers to said one processing unit for subsequent fault analysis.

30. The system of claim 29 wherein a second one of said plurality of said registers is coupled to each of said modules, said second register including a plurality of bistable stages for storing coded signals designating which ones of said modules are enabled for operation; and,
logic means included in each of said plurality of modules, said logic means being connected to said second register and said logic means of predetermined ones of said modules being connected to receive said power confidence status signal, said logic means being operative in response to said power confidence status signal to condition said second register to store in another stage, a signal indication specifying the operational status of said connected module.

31. The system of claim 30 wherein each of said logic gating means is connected to predetermined ones of said optically coupled isolator converter circuits, each said logic gating means logically combining said CML bilevel power confidence signals from said connected converter circuits to generate said power confidence status signal.

32. The system of claim 31 wherein said system interface unit further includes interrupt logic circuits for generating interrupt signals to said pair of input/output processing units in response to the occurrence of predetermined events, said plurality of optically coupled isolator converter circuits further including another optically coupled isolator converter circuit coupled to receive an initial power confidence signal and reference potential signal from a primary power source for said system, said output circuit of said another optically coupled isolator converter circuit being connected to apply a noise free CML bilevel power confidence signal to said interrupt logic circuits and to said first register, said interrupt logic circuits and said first register respectively being conditioned by the state of said CML bilevel power confidence signal to generate an interrupt signal indicating the occurrence of a primary power failure and store coded signals designating the confidence status of said primary power source for subsequent examination by said pair of input/output processing units.

33. The system of claim 31 wherein said input circuit of each of said plurality of optically coupled isolator circuits includes current sensing circuit means, phototransistor circuit means and level detector circuit switching means, said current sensing means being connected to receive said CML bilevel power confidence signal and reference potential signal from said different one of said regulated power supply units, phototransistor circuit means being optically coupled to said current sensing circuit means, said phototransistor means being conditioned by said current sensing means upon sensing a predetermined direction of current to provide an output voltage of a predetermined value and said level detector switching circuit means being connected to said phototransistor circuit means, said level detector switching circuit means being operative to switch from a first state to a second state to generate an intermediate voltage level to said output circuit upon detecting that said predetermined value of said output voltage is greater in magnitude than a predetermined reference voltage.

34. The system of claim 33 wherein said system includes circuit means connected to a predetermined one of said plurality of said regulated power supply units and to each of said plurality of optically coupled isolator converter circuits, said plurality of isolator converter circuits being connected to supply voltage and reference potential inputs from said predetermined one of said regulated power supply units.

35. The system of claim 34 wherein said predetermined one of said regulated power supply units corresponds to the unit which powers said system interface circuit board, each isolator circuit further including a voltage divider resistor network connected at one end to said supply voltage input and at the other end to said reference potential input for providing said predetermined reference voltage.

36. The system of claim 35 wherein said output circuit includes output transistor circuit stage connected to said supply voltage input, said reference potential input and to the output of said level detector circuit means, said transistor circuit stage being operative to convert said intermediate voltage level into said CML bilevel confidence signal.

* * * * *